United States Patent [19]
McAlister

[11] Patent Number: 5,343,699
[45] Date of Patent: Sep. 6, 1994

[54] METHOD AND APPARATUS FOR IMPROVED OPERATION OF INTERNAL COMBUSTION ENGINES

[76] Inventor: Roy E. McAlister, 216 S. Clark, MS 103, Tempe, Ariz. 85281

[21] Appl. No.: 990,071

[22] Filed: Dec. 14, 1992

Related U.S. Application Data

[63] Continuation of Ser. No. 364,309, Jun. 12, 1989, abandoned.

[51] Int. Cl.$^5$ .............. F02B 17/00; F02B 43/00; F02M 21/02; F02M 57/06
[52] U.S. Cl. .................. 60/273; 60/309; 123/1 A; 123/3; 123/151; 123/169 V; 123/348; 123/430; 123/527
[58] Field of Search ............. 60/309, 273; 123/1 A, 123/3, 90.11, 348, 430, 527, 151, 152, 169 V

[56] References Cited

U.S. PATENT DOCUMENTS

| | | | |
|---|---|---|---|
| 1,401,612 | 12/1921 | Landgrebe | 123/151 |
| 3,094,974 | 6/1963 | Barber | |
| 3,173,409 | 3/1965 | Warren | 123/169 V |
| 3,315,650 | 4/1967 | Bishop et al. | |
| 3,682,142 | 8/1972 | Newkirk | 123/3 |
| 3,830,204 | 8/1974 | McAlister | |
| 3,976,034 | 8/1976 | Shinohara | 123/1 A |
| 4,003,343 | 1/1977 | Lee | 123/3 |
| 4,046,522 | 9/1977 | Chen | 123/3 |
| 4,086,877 | 5/1978 | Henkel | 123/3 |
| 4,086,878 | 5/1978 | Eisele | 123/430 |
| 4,108,114 | 8/1978 | Kosaka | 123/3 |
| 4,109,461 | 8/1978 | Fujitani | 123/3 |
| 4,181,100 | 1/1980 | Yamane et al. | |
| 4,253,428 | 3/1981 | Billings et al. | |
| 4,340,013 | 7/1982 | Lindstrom | 123/3 |
| 4,362,137 | 12/1982 | O'Hare | |
| 4,418,653 | 12/1983 | Yoon | 123/3 |
| 4,441,469 | 4/1984 | Wilke | |
| 4,475,484 | 10/1984 | Filho | 123/3 |
| 4,503,813 | 3/1985 | Lindberg | |
| 4,515,135 | 5/1985 | Glass | |
| 4,716,859 | 1/1988 | Konig | 123/3 |
| 4,722,303 | 2/1988 | Leonhard | 123/3 |
| 4,967,708 | 11/1990 | Linder | 123/169 V |

FOREIGN PATENT DOCUMENTS 2410473 9/1975 Fed. Rep. of Germany .......... 123/3

OTHER PUBLICATIONS

Davis et al., "Fuel Injection and Positive Ignition-A Basis for Improved Efficiency and Economy", SAE Progress in Technology Review vol. II, Society of Automotive Engineers, 1967, pp. 343-357.
Finsterwalder, "Deutz Converts Operation by Adding High-Tension Ignition System", Automotive Engineering, Dec. 1971, pp. 28-32.
Simko et al., "Exhaust Emission Control by the Ford Programmed Combustion Process-PROCO", SAE Paper No. 720052, pp. 249-264.
Breshears et al., "Partial Hydrogen Injection inot Internal Combustion Engines Effect on Emissions and Fuel Economy", Jet Propulsion Laboratory, California Institute of Technology, Feb. 1974, pp. i-iv, 1-37.
Finegold, et al., "Dissociated Methanol as a Consumable Hydride for Automobiles and Gas Turbines", Jun. 1982, pp. 1359-1369.

*Primary Examiner*—Douglas Hart

[57] ABSTRACT

A process for operating an internal combustion heat engine which comprises the steps of thermochemically regenerating waste heat rejected by the heat engine by reacting at least one conventional fuel compound containing hydrogen and carbon with an oxygen donor using substantial quantities of the waste heat to produce a mixture of engine-fuel containing substantial quantities of hydrogen and carbon monoxide and utilizing the mixture of engine-fuel to operate an internal combustion engine.

15 Claims, 7 Drawing Sheets

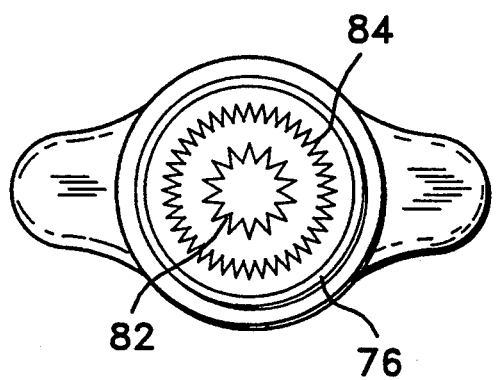
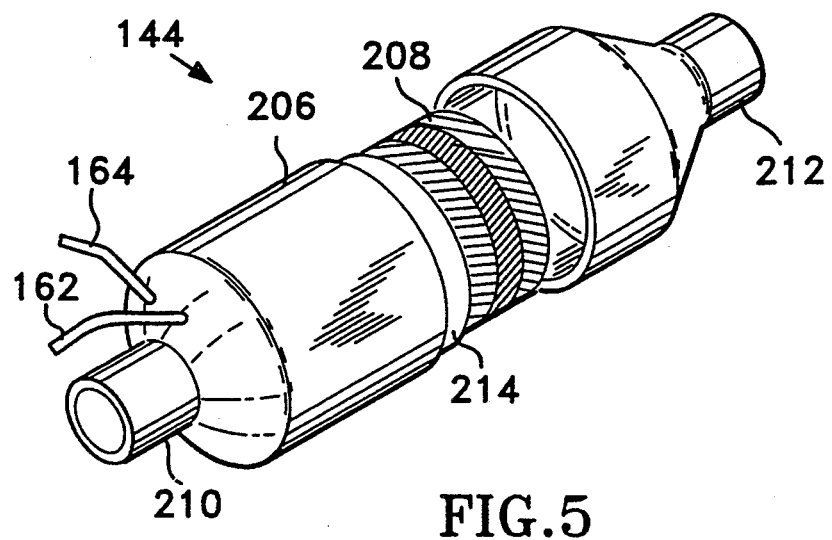

METHOD AND APPARATUS FOR IMPROVED OPERATION OF INTERNAL COMBUSTION ENGINES

This is a continuation of application Ser. No. 07/364,309, filed Jun. 12, 1989, now abandoned.

This invention relates to improved operation of internal combustion engines.

BACKGROUND OF THE INVENTION

There is about one motor vehicle for every eleven persons on earth. Some 400 million cars and trucks are operated throughout the world. The bulk of these vehicles operate in North America and Western Europe. Over 40% of the world's vehicles, about 176 million cars and trucks are operated in the United States. Homogeneous-charge engines power the vast majority of motor vehicles. In these engines it is attempted to develop a homogeneous mixture of air and fuel vapor by fuel injection or carburation into an intake manifold for delivery to the engine's combustion chambers. Homogeneous-charge engines present numerous problems including:

1. Unburned hydrocarbons and carbon monoxide emissions are unacceptable from homogeneous-charge engines. These emissions are caused by quenching of homogeneous-charge combustion processes near combustion-chamber walls. All major cities are polluted by carbon monoxide and unburned hydrocarbons from homogeneous-charge engines.

2. Another cause of unburned hydrocarbons and carbon monoxide from homogeneous-charge engines is operation at insufficient air to fuel ratios to complete combustion processes at the relatively high piston speeds of modern cars. It is a widespread practice to operate the engine at air-fuel ratios for best power production in spite of the fact that operation at excess-air conditions would produce less unburned hydrocarbons and carbon-monoxide emissions.

3. Oxides of nitrogen emissions are unacceptable from homogeneous- charge engines. Increasing the air to fuel ratio as in homogeneous-charge "lean burn" operations increases production of oxides of nitrogen.

4. Several catalytic processes and an auxiliary air supply are needed to clean-up the exhaust streams of homogeneous-charge engines. Modern cars operating at air-fuel ratios optimized for driveability and minimal oxides of nitrogen require addition of air to the exhaust stream for purposes of catalytic combustion of unburned hydrocarbons and carbon monoxide.

5. Unacceptable energy waste occurs as a great percentage of the fuel present in a homogeneous charge burns near combustion chamber surfaces. Heat is transferred to metallic components including the head, valves, cylinder liner, piston and rings without doing useful work.

6. Homogeneous-charge engines must be limited in compression ratio to values that prevent detonating ignition and piston damage. Positive ignition is achieved by spark plugs.

Technology which has been accepted for improving the thermal efficiency of internal combustion engines includes the venerable Diesel engine apparatus and method of direct injection of fuel into the combustion chamber. This technology is characterized as compressing air to produce sufficiently high temperatures to evaporate, chemically crack, and ignite fuel that is sprayed into the compressed air. Such technology requires fuels with specific characteristics that facilitate "compression ignition". Fuels suitable for compression ignition engines have high "cetane" ratings. Direct-injection compression engines often obtain about two times higher miles per fuel-BTU ratings than homogeneous-charge engines in practical duty cycles because of stratified charge advantages of more complete combustion and reduced heat losses from combustion products to engine components.

A substantial problem with the compression ignition engine is the engine weight penalty that stems from requiring about two times more displacement than spark ignited engines of equal power ratings. In operation, this translates to a much larger crankshaft, a larger flywheel, a larger engine block, larger bearings, larger starter motors, heavier-duty batteries, larger tires, heavier springs, bigger shock absorbers, and a much larger requirement for critical alloying resources such as molybdenum, chromium, vanadium, copper, nickel, tin, lead, antimony, and content of manufacturing energy to mine, refine, cast, heat treat and machine than spark-ignited engines. Other difficult if not unacceptable problems include:

1. Diesel engines are notorious for belching clouds of black smoke during stop and go duty cycles. Bus and truck emissions of nauseous, burned-oil smelling, black smoke in city traffic are unacceptable in view of recent efforts by virtually every city of the world to reduce atmospheric pollution from motor vehicles.

2. Diesel engines are extremely difficult to convert to oxygenated fuels ($CH_3OH$, $C_2H_5OH$, etc.) or other clean burning fuels (such as natural gas and hydrogen) because such preferred fuels have high octane ratings and low cetane ratings. Diesel engines require a high cetane rated pilot fuel (Diesel fuel) to torch-ignite clean burning fuels that are "fumigated" into the combustion chamber along with air supplies during intake cycle operations.

3. Fumigation of fuels into the combustion chamber along with air during the intake cycle derates the engine because the fumigated fuel uses part of the breathing capacity and reduces effective volumetric efficiency of the converted engine.

4. Compression ignition engines are hard to start in cold weather. Cold air and cold engine components rob the heat of compression before temperatures are reached that will cause fuel to be evaporated, chemically cracked, and ignited. Expensive subsystems such as spark-ignited starter engines, glow plugs, electric block heaters, and starter fluid dispensers are used in attempts to overcome the difficulties of starting compression-ignition engines in cold weather. Frequently owners of vehicles with compression-ignition engines opt to keep the engine running day and night in the cold season at whatever fuel expense is incurred rather undergo the ordeal of trying to start a Diesel engine in cold weather.

5. Compression-ignition engines operate best in a narrow range of torque-speed conditions. This is because of the characteristic called Diesel-ignition delay and the requirement to tailor the amount of fuel introduced and timing of fuel introduction with respect to the piston speed in order to avoid needless if not damaging pressure rise during the compression cycle and to avoid energy waste and smoke from late burning during the power cycle.

6. Compression-ignition engines require the use of high cetane fuels with carbon to hydrogen mass ratios of about 7. Such fuels and their products of combustion have large radiant energy losses to combustion chamber walls during burning processes. It would greatly improve thermal efficiency to use cleaner burning fuels that have lower carbon to hydrogen mass ratios and much lower radiant energy losses but such fuels cannot be compression ignited in conventional engines.

7. Friction losses are larger in longer stroked, higher compression, and larger bearing area Diesel engines than in spark-ignited engines of the same power rating. In addition to robbing potential power this requires more investment in expensive alloys, case hardening, heat treatment and wear reducing design considerations than required for spark-ignition engines.

Technology for combining the advantages of spark ignition and stratified charge burning have been demonstrated. U.S. Pat. Nos. 3,830,204; 3,094,974 and 3,316,650 and the references cited therein disclose methods and apparatus for introducing fuel directly into the combustion chamber to form a stratified charge mixture of spark-ignitable fuel and ignition of such stratified charges by a spark source. Other published references include "Fuel Injection and Positive Ignition—A Basis For Improved Efficiency and Economy, Burning a Wide Range of Fuels in Diesel Engines"; by Davis, C. W.; Barber, E. M.; and Mitchel, Edward, *SAE Progress in Technology Review Vol. II;. Society of Automotive Engineers,* New York, NY 10017, 1967, pp. 343-357; "Deutz Converts Operation By Adding High-Tension Ignition System" by Finsterwalder, Gerhard, *Automotive Engineering,* December 971, pp. 28-32. Institute of Mechanical Engineers Conference Proceedings, *Fuel Economy and Emissions of Lean Burn Engines,* 1 *Mech E Conference Publications,;* Mechanical Engineering Publications, Ltd., London, 1979; Institute of Mechanical Engineers Conference Proceedings, *Stratified Charge Engines,* 1 *Mechanical Engineering Conference Publications* 1976,; Mechanical Engineering Publications, Ltd., London, 1977; "An Update of the Direct Injected Stratified Charge Rotary Combustion Engine Developments at Curtiss-Wright" by Jones, Charles; Lamping, H. D.; Myers, D. M.; and Lloyd, R. W., *SAE International Automotive Engineering Congress and Exposition, Paper No.* 770044, February 1977; Society of Automotive Engineers, New York, NY, 1977; "An Update of Applicable Automotive Engine Rotary Stratified Charge Developments" by Jones, Charles, *SAE Technical Paper Series No.* 820347; Society of Automotive Engineers, Warrendale, Pa., 1982; "Multi-Fuel Rotary Engine for General Aviation Aircraft" by Jones, Charles; Ellis, David; and Meng, P. R., *NASA Technical Memorandum* 83429, *AIAA*-83-1340; National Aeronautics and Space Administration, Washington, D.C., June, 1983. Such prior art suggests the use of lower compression ratios than required for compression ignition engines and it is inferred that engine weight savings would be offered along with a wider range of operation with respect to piston speed and torque requirements. Common problems that such systems present include:

1. Fuel must be mixed with air and delivered in spark ignitable proportions in the spark gap of a spark source at the exact time needed to initiate combustion. This is difficult because of varying degrees of fuel deflection as a result of widely varying velocities of air entry and swirl in the combustion chamber as piston speeds range from idle to full power.

2. Fuel directed towards the spark source from the fuel injector for purposes of producing a suitable mixture of fuel and air for spark ignition invariably reach metallic heat-robbing areas of the combustion chamber around the spark source. This results in combustion process quenching and heat losses through components of the combustion chamber.

3. Spark sources such as spark plugs are prone to fail because of oxidation and excessive heating due to the location they are placed as a result of efforts to place the spark gap as far into the combustion chamber as possible.

4. Spark sources are also prone to become soot coated during portions of the duty cycle and subsequently fail to deliver adequate plasma energy for assured ignition.

5. Widely varying emissions such as soot at some speeds and excessive oxides of nitrogen at other speeds characterize operation at essential portions of the stop-and-go, city-driving duty cycle such as low-speed acceleration, transient conditions and full power.

6. Efforts to overcome the problems arising from undesirable fuel-air ratios at the spark source during important portions of the duty cycle have resulted in efficiency sacrificing practices of air throttling.

(See "Exhaust Emission Control By the Ford Programmed Combustion Process: PROCO", by Simko, A.; Choma, M. A.; and Repko, L. L.; *SAE Paper No.* 720052, Society of Automotive Engineers, New York, N.Y..)

Another aspect of the problem with such prior art efforts has been the characteristic of requiring highly tuned systems that are adapted to specific fuel properties in order to provide vehicle driveability and to achieve emissions of incomplete combustion and oxides of nitrogen that are acceptable to catalytic clean-up processes in the exhaust stream.

Steam reforming and partial oxidation of hydrocarbons are well-known methods for producing hydrogen. Catalytic steam reforming of light hydrocarbons including natural gas, coal-tar liquids, and petroleum liquids is the least expensive method presently available for producing hydrogen. The use of hydrogen as fuel in heat-engines offers attractive characteristics, particularly including high thermal efficiencies and almost no pollutive emissions.

Efforts to provide technology for reducing the problem of incomplete combustion and to improve thermal efficiency with clean burning hydrogen include the following publications. U.S. Pat. Nos. 4,253,428; 4,362,137; 4,181,100; 4,503,813; 4,515,135; 4,441,469; "Partial Hydrogen Injection Into Internal Combustion Engines Effect On Emissions and Fuel Economy; by Breshears, R.; Cotrill, H.; and Rupe, J.; Jet Propulsion Laboratories and California Institute of Technology, Pasadena, Ca., 1974; "Dissociated Methanol As A Consumable Hydride for Automobiles and Gas Turbines", by Finegold, Joseph G., McKinnon, J. Thomas, and Karpuk, Michael E., Jun. 17, 1982, *Hydrogen Energy Progress IV,* pp. 1359-1369; "Hydrogen Production From Water By Means of Chemical Cycles", by Glandt, Eduardo D., and Myers, Allan L., Department of Chemical and Biochemical Engineering, University of Pennsylvania, Philadelphia, Pa. 19174; *Industrial Engineering Chemical Process Development,* Vol. 15, No. 1, 1976; "Hydrogen As A Future Fuel, by Gregory, D. P., Institute of Gas Technology; "On-Board Hydrogen Generator For A Partial Hydrogen Injection I.C. Engine" by Houseman, John, and Cerini, D. J., *SAE Paper*

No. 740600, Society of Automotive Engineers, New York, N.Y.; "On-Board Steam Reforming of Methanol To Fuel The Automotive Hydrogen Engine", by Kester, F. L., Konopta, A. J., and Camara, E. H., *I.E.C.-.E.C. Record*-1975, pp. 1176-1183; "Parallel Induction: A Simple Fuel Control Method For Hydrogen Engines", by Lynch, F. E., *Hydrogen Energy Progress IV*, Jun. 17, 1982, pp. 1033-1051; "Electronic Fuel Injection Techniques For Hydrogen-Powered I.C. Engines", by MacCarley, C. A., and Van Vorst, W. D., *International Journal of Hydrogen Energy*, Vol. 5, No. 2, Mar. 31, 1980, pp. 179-205.

Definite advantages have been demonstrated by adding hydrogen to hydrocarbon fuels in spark-ignited and in compression-ignited engines. Combustion is more complete and radiation losses are reduced by decreasing the carbon to hydrogen mass ratio. Difficult and notorious problems include low fuel-storage density, back-firing in the intake system, reduced air-breathing capacity as hydrogen contains much less energy per volume measure than gasoline and other hydrocarbon vapors, reduced engine-power ratings, and an increased danger of fire in underhood and hydrogen storage areas.

In addition to powering transportation vehicles, internal combustion engines power many stationery devices. Rising electric rates and urgent needs to improve the air quality in heavily populated areas provide an important opportunity for internal combustion engine powered electric generators and air conditioning systems. Total energy, cogeneration, and hot-tap engine drive systems generally connotate on-site use of the heat rejected by an engine along with the shaft energy to reduce the overall energy consumption and pollutive load on the environment by 40 to 75%. Such systems usually consist of an internal combustion engine, waste heat recovery exchangers to safely interface potable water with cooling jacket water and exhaust gases, and a driven load such as an electric generator or a heat pump compressor. Problems with such systems include low thermal efficiency of the internal combustion engine, inadequate heat recovery from the heat exchangers and inadequate life of engines. Corollaries of the last mentioned problem are unacceptable maintenance requirements and high repair expenses.

SUMMARY OF THE INVENTION

An object of the present invention is to overcome the problems noted above. In accordance with the principles of the present invention, this objective is accomplished by providing a process for operating an internal combustion heat engine which comprises the steps of thermochemically regenerating waste heat rejected by the heat engine by reacting at least one conventional fuel compound containing hydrogen and carbon with an oxygen donor using substantial quantities of the waste heat to produce a mixture of engine-fuel containing substantial quantities of hydrogen and carbon monoxide and utilizing the mixture of engine-fuel to operate an internal combustion engine.

Another object of the present invention is the provision of a process for operating an internal combustion engine comprising the steps of reacting endothermically a carbon containing fuel with a reagent containing hydrogen and oxygen to produce substantial quantities of a mixture of carbon monoxide and hydrogen, injecting the mixture directly into the combustion chamber of an internal combustion engine at a time that is substantially at top dead center and combusting the same to produce more products of expansion than would be present if the fuel were individually combusted.

Still another object of the present invention is the provision of a process for operating an internal combustion engine comprising the steps of reacting endothermically a carbon and hydrogen containing fuel with an oxygen containing reagent to produce substantial quantities of a mixture of carbon monoxide and hydrogen, injecting the mixture into the combustion chamber of an internal combustion engine at a time that is substantially at top dead center and combusting the same to produce more products of expansion than would be present if the fuel were individually combusted.

These and other objects of the present invention will become more apparent during the course of the following detailed description and appended claims.

The invention may be best understood with reference to the accompanying drawings, wherein an illustrative embodiment is shown.

BRIEF DESCRIPTION OF THE DRAWINGS

FIG. 3 is an end view of the device of FIG. 2 showing the location of ignition electrodes.

FIG. 5 is a perspective view of apparatus for recovering exhaust heat to be used to drive endothermic reactions between fuel and an oxygen donor.

Figure 1:
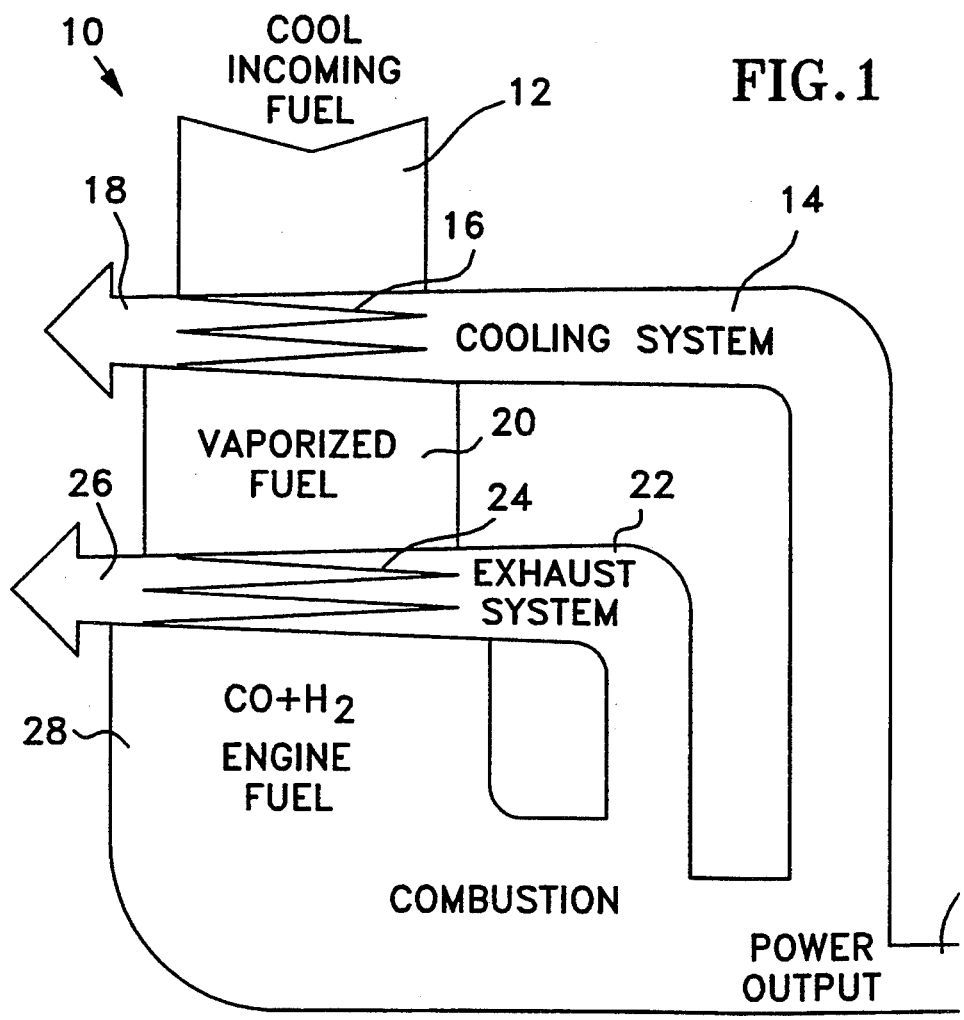
FIG. 1 is a schematic illustration showing thermodynamic processes of the invention.

DESCRIPTION OF THE PREFERRED EMBODIMENTS:

Waste heat (normally rejected through the cooling and exhaust systems) is used to supply endothermic heat energy required to drive reactions between a primary fuel and oxygen-donor feed stocks such as air, water or alcohols to produce a preferred fuel called "engine-fuel". This enables 20% to 40% greater heat input to the engine upon combustion of the engine-fuel (and, therefore, 20% to 40% greater vehicle range) than could be delivered by conventional engines directly burning the same amounts of natural gas, gasoline, or fuel alcohol feedstocks. This process is illustrated in FIG. 1. In FIG. 1, heat transfer 10 is schematically depicted as energy vectors crossing each other. The width of each energy vector (arrow) depicts the magnitude of energy that is represented as heat, mechanical or chemical potential energy. The chemical potential energy of incoming fuel and any other chemical feed stock to be used in the engine is shown as arrow 12. Cooling system heat is shown as arrow 14 which is reduced in magnitude as shown by arrow 18 as a result of heat transfer to incoming fuel at 16. Heated incoming fuel is increased in energy by the heat transfer as shown by arrow 20. Heat from exhaust gases is transferred to fuel 20 at 24 as shown to reduce the energy of the exhaust gases from 22 to 26 and increase the energy of the fuel to 28 by temperature increases and creation of hydrogen and carbon monoxide. The engine-fuel 28 is burned in the engine to produce motive power 30 and supplies of waste heat 14 and 22.

Representative temperatures of the processes shown in FIG. 1 are 70° F. at 12; 200° F. at 20; 500° F at 28; 800° F. at 22; 225° F. at 26; 240° F. at 14; 100° F. at 18. These temperatures vary depending upon the compression ratio of and mode of operation of the engine involved in the application.

It is preferred to provide heat exchange between hot engine-fuel at 28 and preheated fuel 20 in instances that large engines using appreciable amounts of fuel are involved. Depending upon the degree of heat transfer desired, this reduces the temperature of engine-fuel to something approaching the temperature of the engine cooling system and enables a much lower cost construction for the fuel delivery components because thermal degradation factors are reduced.

High flame speeds, wide combustible limits, high thermal efficiencies, elimination of particulates, extremely low carbon monoxide and no unburned hydrocarbons characterize engine-fuel combustion results with the invention.

Figure 2:
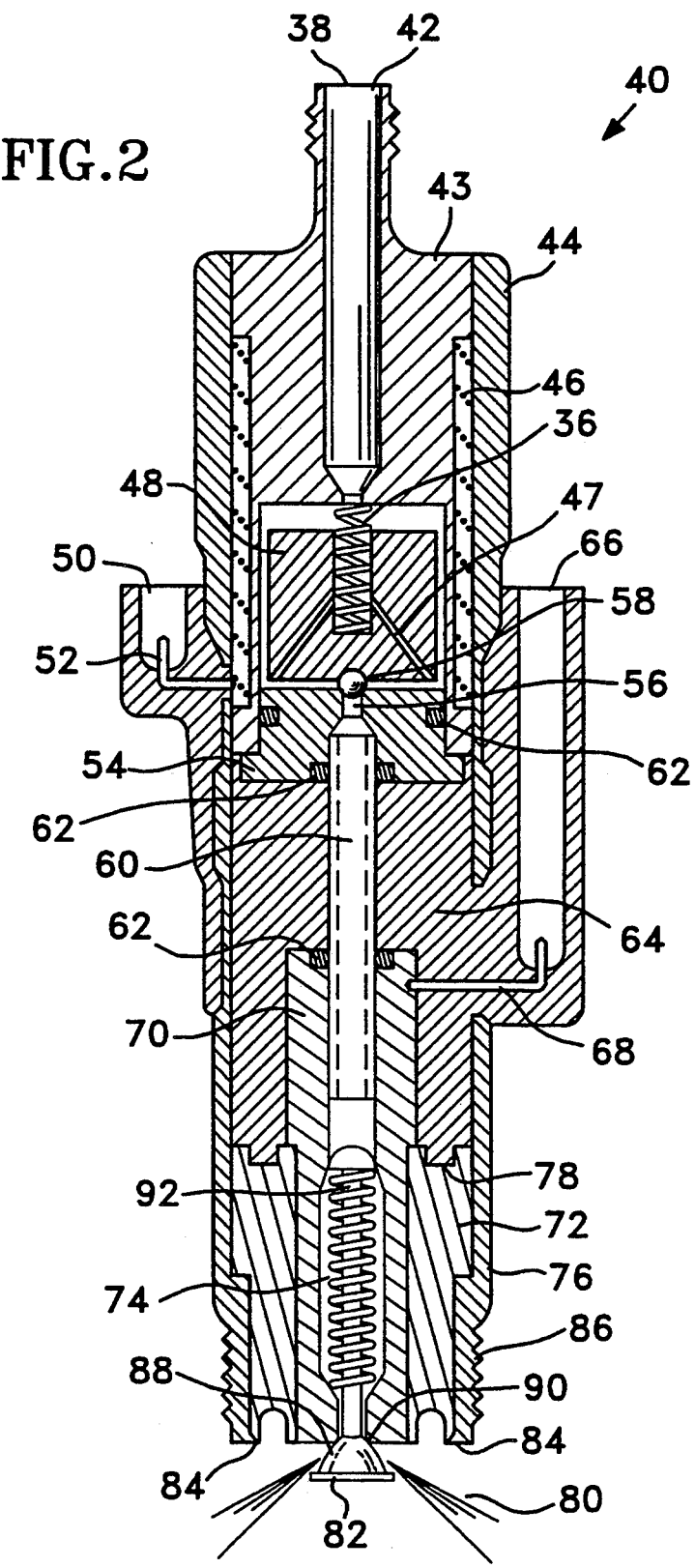
FIG. 2 is a longitudinal sectional view of a device constructed in accordance with the principles of the present invention for directly injecting and igniting fuel in the combustion chamber of an engine.

These basic advantages are preferably facilitated by the use of a combination fuel-injection and spark-ignition device 40 as shown in FIG. 2 to introduce the engine-fuel directly into the combustion chambers of internal combustion engines after substantial compression of the air supply. Embodiment 40 is provided with the same thread and reach 86 as spark plugs for the engine served by the invention. In instances that the invention is applied to Diesel engines, the design at 86 duplicates the configuration of the conventional fuel injector in the area that provides a seal to the combustion chamber.

As shown in FIG. 2, pressurized engine-fuel enters embodiment 40 at 42 and is prevented from entering the combustion chamber as fuel spray 80 until just before pressure increases are needed for the power cycle in the combustion chamber. At the proper time, fuel is allowed to pass solenoid poppet 48 which is actuated by an electromagnetic force resulting from the flow of current in winding 46. Poppet 48 is preferably moved against the direction of incoming fuel flow. Voltage to drive current through coil 46 is supplied by connection 52. Coil 46 may be grounded to conductive body 48 or returned by suitable connection (not shown) such as 52. High voltage for ignition is delivered by a suitable spark wire and terminal in high voltage well 66. Connection 68 delivers the high voltage to conductive nozzle assembly 70. High voltage is carried by compression spring 74 to wire bar 92 to poppet 82. Spark plasma is developed across the gap between 82 and 84 as fuel is sprayed into air in the gap to produce fuel ignition.

Fuel flows past metering body 56 to dielectric tube 60 when poppet 48 is lifted from seat 54. Tube 60 may be sealed by any suitable means including 0-rings 62 to prevent leakage of the engine-fuel. Fuel is delivered from tube 60 to electrically conductive nozzle 70. Compression spring 74 acts against a wire bar 92 that is attached to check valve poppet assembly 82.

Check valve poppet assembly 82 includes component 88 that is normally at rest against seat 90 of nozzle 70. Moveable element 88 may be formed in any suitable shape as may seat 90 to produce the desired spray pattern 80 for the particular combustion chamber that the invention serves. It is the object of spray pattern 80 to produce a great degree of air utilization in combustion reactions while minimizing heat losses from combustion products after ignition.

In application on smaller engines, it is often most suitable to provide a large included angle for a concave conical seat 90 for use with a convex conical poppet 88 of slightly smaller included angle. This cone within a cone or "cone-cone" check poppet and seat arrangement results in considerably larger surface to volume ratios for fuel entering the combustion chamber than from any number of orifices which are typical to prior art injectors. Fuel entering the combustion chamber is squeezed into a thin coniform layer by the action of spring 74 and dynamic forces of air compression against the air-side of poppet 88. Fuel combustion is extremely fast because of the large surface to volume spray that is presented.

The angle chosen for concave conical seat 90 is usually optimized for the purpose of directing the conical fuel spray elements along the longest possible path before intersecting a surface of the combustion chamber. Ignition occurs at the beginning of fuel entry into the combustion chamber and continues throughout the time of fuel flow into the combustion chamber. This provides the greatest air utilization and the longest burning time for fuel before approaching a quench zone of the combustion chamber. The present invention provides an included angle of entry that considers the amount of fuel delivery as a function of piston speed. At idle conditions and low piston speeds the amount of fuel delivery is small. At maximum torque production, high-speed conditions the amount of fuel delivery is much larger and occurs during a greater number of degrees of crank-shaft rotation. The present invention provides optimized air utilization for different flame speeds by providing an included angle for the fuel cone that aims the entering rays of injected fuel at the outer rim of the piston during the highest fuel flow rate of the intended duty cycle.

For optimizing the fuel pattern for hydrogen or engine-fuel, the included angle is large and the fuel is aimed at the piston rim at near top dead center. For slower burning natural gas or petrol fuels the included angle is smaller and the fuel is aimed at a piston-rim location somewhat after top dead center. The opportunity is provided to optimize power production for start-up conditions in which a conventional fuel such as natural gas, gasoline or Diesel fuel is burned and then after production of engine-fuel to have extremely advantageous operation including production of more power and better economy than with conventional fuel injectors. Important applications include military vehicles, emergency electric generator drives, police cars, ambulances, and fire trucks.

It is preferred to form poppet 88 from sheet material and to provide highly angular points on the lower skirt as shown for the purpose of reducing the discharge voltage for plasma generation. It is preferred to form electrode skirt 84 with highly angular points, as shown, for the same purpose. Alternate geometries of poppet 88 and form for seat 90 that are particularly suitable to combustion chambers of larger displacement engines is a spherical form in which the spherical surface of 82 contacts a concavo-spherical seat 90 of somewhat larger radius. This sphere within a sphere or "sphere-sphere" check poppet and seat arrangement results in a fuel spray cone 90 that tends to provide increased surface to volume and greater air utilization than the cone-cone arrangement described previously. In lightweight engines with high piston speeds, such as racing engines, it is preferred to maximize the flame speed by forcing production of an even greater degree of fuel surface to volume ratio by providing a convex-spherical seat 90 on which a convex-spherical surface of 82.

In order to achieve satisfactory fuel penetration into the compressed air mass of larger combustion chambers it is advantageous to provide channels such as 88A or 90A in the surface of 88 or 90. These channels 88A or 90A carry greater fuel flow than the areas between the channels and provide greater fuel penetration than from areas between the channels. Helical and other patterns of channels in 88 that provide acceleration of the fuel at angles with the shortest distance of travel from the orifice in nozzle 70 to the combustion chamber, cause rotation of component assembly 82 and 88 which is advantageous in polishing seat 90 to keep it clean and uniform.

These various cone-cone, sphere-sphere, sphere-cone and cone-sphere channel geometries provide important improvements over the prior art. Prior-art Diesel fuel injectors and the injectors anticipated by U.S. Pat. Nos. 3,830,204; 3,094,974 and 3,316,650 utilize sprays of fuel from one or more individual holes to spray fuel into air masses within the combustion chamber. Embodiments of the present invention deliver fuel in a conical form having much higher surface to volume ratio and does so in a pattern that assures completion of combustion events before the fuel reaches quench zones within the combustion chamber. These various embodiments answer the need to optimize air utilization requirements in virtually any combustion chamber design without resorting to efficiency-sacrificing air swirl and intake-air throttling techniques.

Injection of the fuel into air produces a local zone of fuel-rich conditions within an envelope that provides excess air to fuel conditions which is surrounded by insulative air. Ignition occurs by passage of ignition spark-plasma energy through the alternate layers of air, excess-air-fuel zones, fuel-rich zones, excess-air-fuel zones, and air. The greatest flame speed occurs in the fuel-rich zones. Even at the highest piston speeds this creates a fuel-rich, higher-speed combustion-process driver within excess air zones that assures completion of combustion events in slower combustion rate areas.

Prior art devices depend upon swirl of the air in the combustion chamber to deflect fuel sprays into helical paths in order to prevent penetration to quench zones. Creating swirl of air in the combustion chamber is produced by impedance to air entry. This reduces the mechanical efficiency of the engine by incurring reduced pressure over the piston compared to the pressure under the piston. More mechanical work must be done to overcome the manifold-vacuum condition than if there was no impedance to air entry.

Prior-art approaches depend upon variable air throttling in all practical modes of operation to produce homogeneous, substantially constant-ratio mixtures of fuel and air at all levels of power production. In order to be spark ignitable the air had to be throttled so the fuel could be reduced from highest power ratings to lowest power ratings. This type of operation greatly reduces part-load efficiency by increasing the pressure difference through which the piston must operate during intake conditions.

The present invention facilitates use of multiple intake valves, sleeve valves, combined intake and exhaust valves, and other arrangements that impede the air less than conventional arrangements that produce air swirl in the combustion chamber. The present invention contemplates unimpeded air entry into the combustion chambers at all power levels for maximum mechanical efficiency regardless of the power level. This provides more power, smoother operation without "dead spots", and a greater range of acceptable speed-torque conditions.

It is preferred to operate the present invention at overall fuel-air ratios ranging from far excess air at low power settings to excess air at highest power settings. Completion of combustion processes and excess-air insulation of heat released by combustion characterize the operation at all power levels.

The known limits of flammability, flame speed, and heat of combustion of various fuels including the main constituents of engine-fuel shown that hydrogen, which characterizes engine-fuel combustion processes herein provides a flame speed that is more than 7.5 times that of common fuel selections such as methane. This enables much later injection and ignition of engine-fuel than conventional fuels such as methane or gasoline and results in greatly improved brake mean effective pressure per BTU of fuel value by not incurring back work during slow-burning pressure rise in the compression cycle of the operation.

Engine-fuel combustion is characterized as an extremely-fast colorless combustion process and the degree of heat loss by radiation to combustion chamber surfaces is negligible compared to conventional engines. The present invention facilitates injecting and igniting engine-fuel just after top dead center (TDC) to provide much quieter operation because piston knock and vibration due to untimely ignition during the compression cycle are eliminated by the invention. Converted engines runs cooler, smoother, and quieter than with conventional fuel conditioning and delivery systems.

Figure 4:
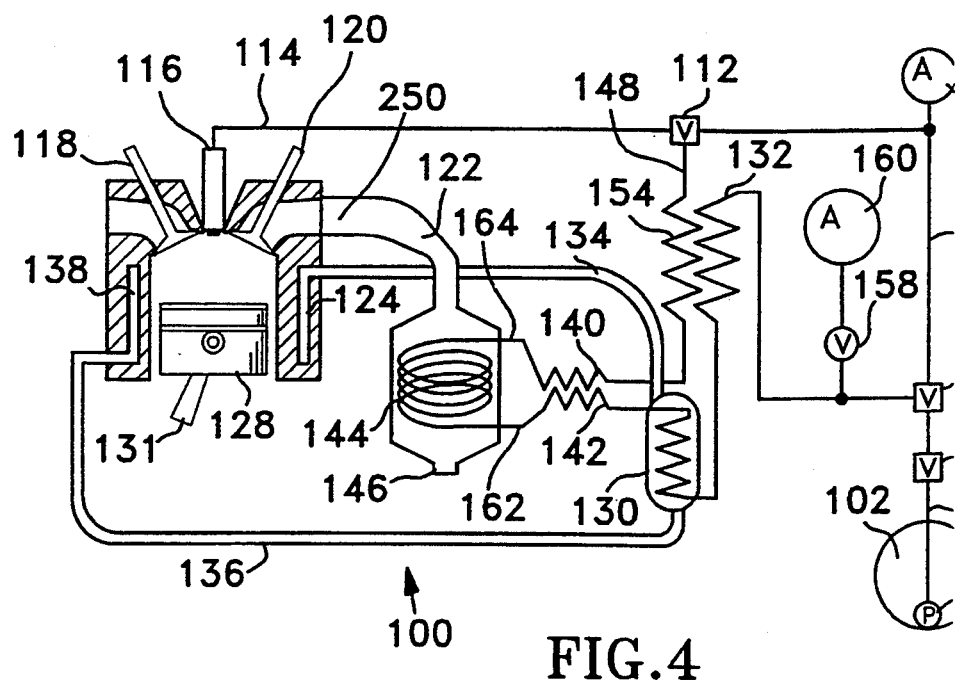
FIG. 4 is a schematic circuit diagram of the invention showing a sectional view of a representative combustion chamber, a cooling system, an exhaust system, fuel storage, fuel pressurization, a cooling system, waste heat recovery exchanger, an exhaust heat recovery exchanger, and delivery of engine-fuel to the combustion chamber.

FIG. 4 shows the method of the invention in a schematic circuit of thermal, mechanical, and thermochemical operations. An improved heat engine 100 is shown. Fuel is stored at 102. The fuel may be any suitable selection such as compressed natural gas, fuel alcohol, liquid natural gas, gasoline, or Diesel fuel. Liquid fuels stored at ambient pressure are preferably pressurized by pump 104 to required fuel injection pressure which ranges depending upon fuel viscosity, surface tension, molecular weight, and carbon to hydrogen mass ratio, from about 100 to 1,500 psi above the compression pressure of the engine. At start-up conditions the cold fuel is delivered to three-way valve 108 and directed to the engine through line 110, three-way valve 112, and fuel injector 116. Fuel is sprayed into and ignited within all combustion chambers that are about 5 to 70% into power (expansion) cycles. Rapid heating of the air and power delivery results. The engine is started without a starter motor. After the engine is started, injection and ignition timing are advanced to provide optimum operating conditions.

This is an important improvement over prior art methods of starting an engine. It results in much reduced package weight, initial cost savings, and elimination of starter-system maintenance expense. It is preferred to use a conventional electronic microprocessor with memory for monitoring, starting, and optimizing the engine. Piston locations within combustion chambers are stored at shut down and recalled for the start-up routine. The microprocessor facilitates safe operation by instantaneous monitoring of oil pressure, temperature, vibration, and other vital instrumentation to provide emergency shut-down if the engine has no oil or if other malfunctions occur.

Compressed gas fuels stored in 102 are pressure reduced from the storage pressure and regulated at the desired pressure of delivery. It is preferred to use an electric pump for pressurization of liquid fuels. In instances that the bearing designs require pressurization of oil to the crank and cam shaft bearings before startup, it is preferred to provide a safety interlock to prevent fuel injection until oil pressurization by a suitable hand or electric pump has been accomplished.

After the engine has warmed up and the temperature at thermochemical converter 144 has reached about 500° F., valve 108 shuttles to direct fuel to line 152 and to heat exchanger 154. The engine continues to operate on fuel supplied by accumulator 152. Fuel and any other desired oxygen donor (such as air) from tank 160 is pressurized by suitable pump 158 and heated in heat exchanger 130 by cooling fluid delivered from the engine by conduit 134. Combinations of fuel from tank 102 and water or another oxygen donor from tank 160 are called "reactants". Further heating of the reactants is accomplished by countercurrent exchange between 140 and 142 with engine gas produced in thermochemical converter 144.

Final heating of the reactants and production of engine gas results from catalytic processes in converter 144. Hot exhaust gases ranging in temperature from over 1100° F. to 600° F. depending upon the duty cycle are delivered by exhaust conduit 122 to thermochemical converter 144. Cooled exhaust gases pass through exhaust conduit 146. Cooling jacket fluid is returned to the engine through conduit 136 for circulation through suitable cooling passages 138 and 124. Another heat rejecting circuit comprising an ordinary radiator and thermostatic valve may be used in series or in parallel with the circuit of 134,130, and 136.

Engine-gas is delivered to three-way valve 112 and directed to the engine through line 114 and fuel injector 116. It is preferred to use the combination fuel-injector and spark-ignitor shown in FIGS. 2 and 3.

Figure 6:
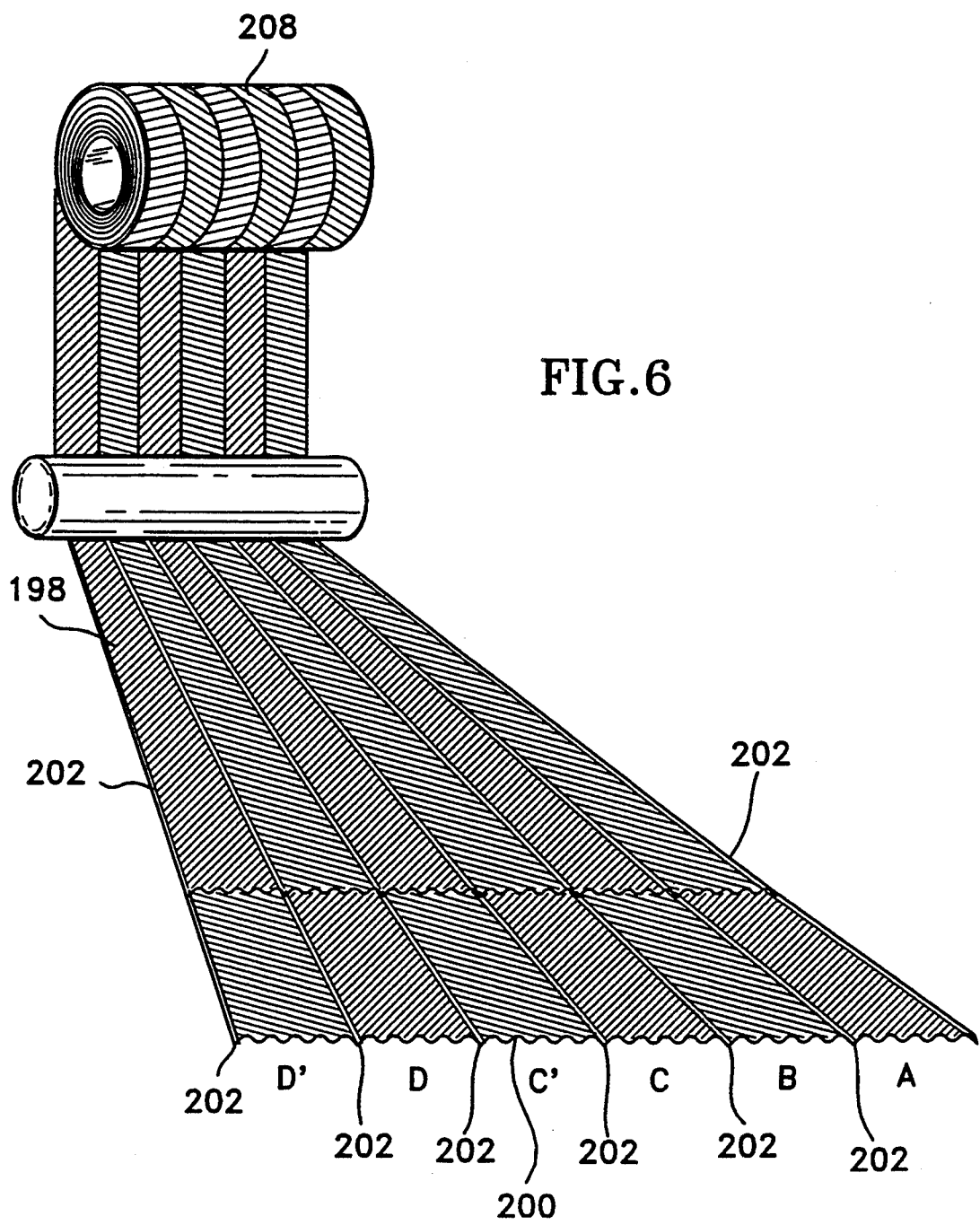
FIG. 6 is a schematic view of details of a preferred heat exchanger tube-fin fabrication technique utilized in accordance with the principles of the present invention.
Figure 7:
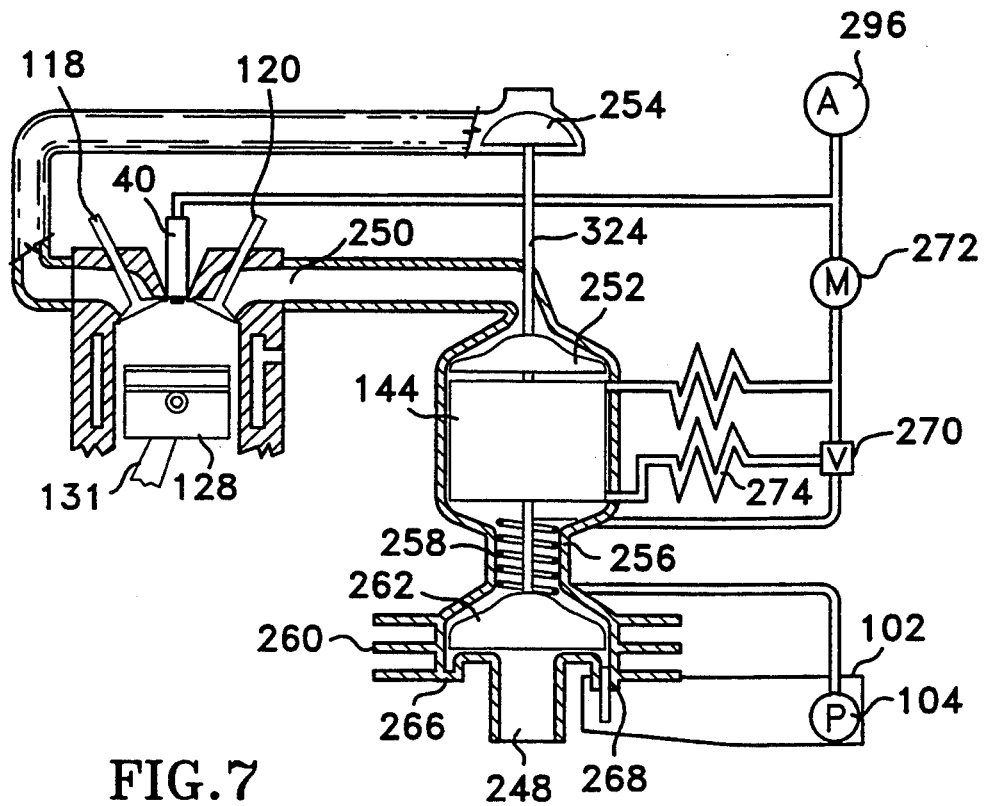
FIG. 7 is a schematic view of details of a preferred heat exchanger fin stock used to fabricate the heat exchanger shown in FIG. 6.

Details of the preferred embodiment for thermochemical converter 144 are shown in FIGS. 5, 6 and 7. Recovery of waste heat from the engine is provided by passing hot exhaust gases into inlet 210 of canister 206. Heat exchange from hot exhaust gases heats the feed stocks delivered through tube 162. Thermochemically converted engine-fuel leaves reactor 144 through tube 164 and is preferably cooled by regenerative heat exchange to feed stock fluids in heat exchangers 140/142 and 132/154 as shown in FIG. 4.

Heat exchange and catalytic conversion of feed stock fluids within 206 are provided by flat tube coil 208. Tube coil 208 is preferably made from two strips of metal that are formed to provide extremely high surface areas for heat transfer and catalytic actions upon mixtures or solutions of feed stock fluids. One such embodiment 200 for the strip stock is shown in FIG. 7. Strip 200 is formed to have corrugated, knurled, herringbone, or otherwise circuitous surfaces as shown. It is bonded to sheet 198 along seam 202 as shown. Sheet 198 may be formed like 200 or provided as an essentially smooth sheet as shown in FIG. 7. A particularly high surface to volume catalytic heat exchanger is formed from sheets 198 and 200 in which each sheet is corrugated to from herringbone designs in the areas between seams 202. The herringbone corrugations of each sheet are opposite the other sheet. This provides parallel internal tubeways between seams 202 that have circuitous internal channels to cause turbulent flow of reactants at all points of fluid progress through the reactor and turbulent flow of exhaust gases through the corrugated spaces that are provided between layers of the assembly.

Tube ways are manifolded to provide the desired circuit through the reactor. It is preferred to have counter-current heat exchange in which the coolest fluid entering the reactor receives heat from the coolest exhaust gases. After manifolding the tube-ways, the assembly is spiral wound on a tube and the assembly is encased in insulated canister 206. The spiral-wound assembly is shown in FIG. 5.

Heat additions through catalytic surfaces are preferred to perform the desired reactions of Equations 1-11. The embodiment shown in FIGS. 5, 6, and 7 provides high thermal conductivity with catalytic functions. Sheet materials for reactor 208 may be a wide variety of alloys and surface coatings for iron, aluminum and copper based sheet structures. The catalyst selections have further roles of serving as bonding or sealing agents in the catalytic heat exchangers. After forming, seam welding, manifolding, and coiling, the assembly may be furnace or induction brazed to bond contact areas inside the flat tubes and between layers of flat tubes. This greatly strengthens the assembly.

Sheet strip selections are first plated or hot-dip coated to uniform coating thicknesses by any suitable production line technique and then roll-bonded or seam-welded along the seam zones 202. It is preferred to bond all areas of contact between sheet 198 and 200 to arrest pressure stresses from the fluids within the flat tubes. It is also anticipated that diffusion gradients of desired catalytic agents would be produced by multiple platings or coatings followed by heat treatment.

Although zinc and copper have been recorded in prior art efforts to dehydrogenate alcohols, it is important to note that the present invention uses catalytic alloys of zinc and copper or coatings containing zinc and copper in solid solution to provide heterogeneous dehydrogenation of alcohols, organic solutes, and water more or less simultaneously. A series of intermediate reactions are believed to be responsible for the overall reactions as shown in Equations 1-11. A particularly useful aid to the understanding of intermediate reactions is found on pages 535 through 586 of the Second Edition of the Kirk-Othmer "Encyclopedia of Chemical Technology" and this reference is incorporated herein.

Alloy sheet catalysts have considerable ductilities and allow cold working to form turbulence-inducing patterns, such as corrugations or crossed rows of embossments depending upon the hot endurance strength of the selected sheet system at the operating temperature chosen for the application. Sealing the lower sheet to the upper sheet is accomplished by metallurgical joining along 0.090" wide seams 202 between 1" wide channels 204. A suitable sheet-stock thickness for strips 198 and 200 of the embodiment of FIG. 6 is 0,010" with a corrugated channel depth of 0.015" to 0,060". This gives a very low clearance volume within the assembled reactor coil.

The inventory of engine-fuel is minimized by the low clearance volume in all parts of the fuel conditioning system. To further assure safety, pressure is monitored in lines 106, 152, and 114. If the rate of pressure change exceeds a narrow preset value, pump 104 is stopped and valve 170 is closed to prevent entry of additional fuel to the fuel-conditioning system. Because heat exchangers 130 and 144 are housed in water cooling or exhaust systems, additional fail-safe virtues are inherent. If a leak in heat exchanger 130 or 144 would occur pump 104 would shut down, normally-closed solenoid valve 170 would close, and the small inventory of escaping fuel would be contained in water or in the exhaust pipe where it could do no harm.

Fuel pressures of 10,000 psi at 1,000° F. are practical with catalyst sheets having yield strengths of 20,000 psi or more because of the tightly coiled and bonded spiral assembly. Additional aid in arrestment of stress is by transfer of compressive preload from the outer containment cylinder 206.

It is preferred to thermally isolate coil 208 from canister 206 by refractory fiber sleeve 214. This provides an air cooled containment cylinder 206 in which tensile loading occurs to produce compressive loading of coil 208. Use of the insulator sleeve provides a space for ⅛" OD, 0.095" wall manifold tubing of a 60%-Cu/38%-Zn/1%-Sn alloy, which is also used to convey engine gas to heat exchanger section 130 and to fuel injectors 116. In applications where additional safety considerations are warranted it is preferred to clad tubing 106, 152, 148, and 114 with a sheath of high-strength stainless steel such as 177 PH. Inlet manifolding and a core for the spiral assembly is provided by joining the coil to a 3" diameter, 0.187" wall tube that is internally partitioned to provide desired series-parallel flow of vapors through C and C' and then in parallel through D and D'. Exhaust gases pass into the reactor from connections 210 to 212 to provide a modified counter current heat-exchanger, endothermic-reactor combination.

Engine-cooling-jacket water at 180° to 250° F. (if it exists) may be circulated in an additional section of heat exchanger 130 to provide standardization of the engine gas temperature. In this instance, the cooling jacket water would be circulated from 124 to 138 through heat exchanger 130 as shown in counter-current arrangement to flow of engine gas.

An alternate arrangement for providing desired heat exchanges is to build heat exchangers 130 and 132/154 in one assembly with thermostatically-controlled engine-jacket water circulation from inlet 124 to 138. In emerging engines with material selections that allow combustion-chamber wall temperatures of 500 degrees F. and higher, it is preferred to provide standardization of the engine-fuel temperature with split-phase heat-pipe heat exchangers. Final heat sinking to the vehicle frame, cogeneration heat requirements for air conditioning, and further preheating of feedstock supplies of wet-fuel alcohols are contemplated.

Pressurized engine-fuel is controlled by solenoid-operated, three-way valves 108 and 112. Engine-fuel in heat exchanger section 154 is monitored for temperature and pressure. Valve 112 is operated "OPEN" to allow flow from heat exchanger section 154 to the fuel injectors if the temperature and pressure are within preset limits. Valve 112 is "CLOSED" to flow from 154 but "OPEN" to flow from pump 104 and provides assured engine start-up and operation with injection of liquid fuel until desired temperatures and pressures are developed in section 154. During operation with liquid fuel, map "A" of the fuel management system is used. During operation with gaseous engine fuel map "B" is used. Operation between maps A and B is electronically switched in correspondence to the operation of solenoid valve 112.

Fuel entering the combustion chamber is ignited by sparks that pass through alternate layers of air-fuel-air and ignition is assured regardless of the overall combustion chamber inventory of air and fuel. Overall air to fuel ratios of 1,000 to 1 are as assuredly ignited by the invention as are air to fuel ratios of 15 to 1. The invention provides best fuel economy and minimum emissions during cold-engine conditions with direct-injection and spark-ignition of liquid fuels. Later, after reaching the engine's designated operating temperature, the invention provides useful recovery of engine waste heat by operating on gaseous fuels that produce considerably more energy upon combustion than the feedstock liquid fuels. The invention facilitates these fuel efficiency advantages without sacrificing specific power ratings of the engine in power-per-thermal-unit comparisons. This is an extremely important aspect of the invention because it is generally necessary to specify 30% to 150% larger displacements and increased compression ratios (than for carbureted gasoline fuels) when use of gaseous fuel is contemplated. The larger engine requirement cascades into a number of application penalties including:

1. Larger tires, shock absorbers, springs, starter motors, batteries, alternators, power assist units, transmissions, and brakes for a greater curb weight in transportation applications.

2. Greater requirements for iron, chromium, molybdenum, vanadium, manganese, nickel, and petroleum reserves. More energy is required to mine, mill, refine, alloy, cast, forge, machine, and build the larger engines. The greater demands upon finite reserves of critical materials produce higher prices per pound and force inflation in the world's economy.

In addition, the invention overcomes the difficult problem of back-firing, wherein hydrogen is inopportunely burned within the intake manifold of carbureted or manifold injected engines. This problem stems from the fact that hydrogen will support combustion in remarkably wide fuel-to-air ratios and because flame speeds in hydrogen combustion are extremely high. The invention prevents back-firing by eliminating any mixing of hydrogen and air until the fuel-injection event within the combustion chamber.

Production of engine-fuel from inexpensive fuel alcohols and compressed or liquid natural gas is facilitated. A longer-range regime would use coal-sourced methane and wet methanol. The present invention thermochemically processes and utilizes feedstocks that are less refined and less expensive than gasoline or Diesel fuels. In use with conventional gasoline or diesel fuels, considerable range and thermal efficiency improvements are offered.

Fuels such as natural gas, coal gas, acetone, methanol, ethanol, propanol, propane, butane, and butanol are attractive replacements for petroleum fuels. The fuel alcohols and light paraffins are readily produced from coal, peat, oil shale, tar sands, natural gas, solid wastes, or freshly-grown biomass. The United States has about 20 times as much energy reserve in coal as the Middle East has in oil reserves. Using coal-sourced fuel alcohols is facilitated and the invention allows increased volumes of petroleum to be used for making polymers and petrochemicals.

A well-recognized and long-standing problem concerning fuel alcohols is the energy-intensive nature of producing fuel alcohols from coal or biomass. Water present in the coal or biomass feedstocks, along with steam used in reactions with carbonaceous feedstocks to gasify the feedstocks requires considerable energy to reach process reaction temperatures. After generation of mixtures of hydrogen and carbon monoxide (water-gas) and catalytic synthesis of fuel alcohols, considerable additional energy often is required to remove water condensates and produce anhydrous fuel.

Commercial production of methanol by the Oxyl process, the action of fermentation enzymes, or destructive distillation of cellulose could be considerably less energy-intensive if the product could be used "wet" (130- to 190-proof) rather than "dry" (200-proof). This invention facilitates the advantageous usage of natural gas, wet-fuel alcohols, water-soluble or alcohol-soluble organic compounds, and engine waste heat by the illustrative reactions shown below.

WET NATURAL GAS plus WASTE HEAT yields
$$CH_4 - H_2O + HEAT \longrightarrow$$

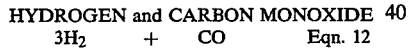

$$HYDROGEN \text{ and } CARBON \text{ } MONOXIDE$$
$$3H_2 + CO \quad \text{Eqn. 12}$$

The reactants in Equations 1–8, consisting of one or more alcohols, one or more soluble organics, and water, are heated by exchange with exhaust gases to temperatures ranging from 225 to 1,000 degrees Fahrenheit. Hot organic-compound vapors and steam mixtures are passed through a catalyst to produce mixtures of carbon monoxide and hydrogen. In Equation 9, natural gas or biomass methane is reacted with steam to produce hydrogen and carbon monoxide. Equations 10 and 11 typify the reaction of gasoline and diesel blends with a liquid containing oxygen to produce carbon monoxide and hydrogen upon endothermic reaction. These reactant blends would also contain emulsifiers for long-term storage purposes. The vaporous product or engine gas is used in the combustion chamber as a stratified-charge fuel and is spark-ignited.

Heat-release potentials for complete burning of the engine gas constituents exceed the complete burning potentials of the fuel feedstocks by 20% to 40%. Increases in heat-release potentials are derived by exchange from engine waste heat to the endothermic reactions generally shown in Equations 1-11. Equally important is the opportunity to use wet fuels that are 30% to 50% less energy-intensive in initial production than are the anhydrous alcohols, phenol, or other organic-compound counterparts.

Another problem that the present invention overcomes concerns the ability to gain as much power per BTU or calorie of heat release from engine-fuel as gasoline produces in spark-ignited engines. It is generally conceded that gaseous-fueled engines require considerably larger engine displacements than gasoline-fueled engine per unit of power development. This is because previous attempts to use gaseous fuels have mixed the fuel with air during intake processes. Considerable breathing capacity and cycle energy have been diverted to introducing the gaseous fuels into the engine. In the present invention, the full breathing capacity of the engine is reserved for intake of excess volumes of combustion air. Brake mean effective pressures (BMEPs) are higher because the pistons are not required to do work (against crankcase atmospheres) as a function of manifold vacuum.

Water requirements not met by using wet alcohols may be supplied by condensation of water vapor from the exhaust gases of the heat engine employing the invention. Approximately one gallon of water is produced from each gallon of hydrogenous fuel burned by a heat engine. Illustratively, one mole of octane (gasoline) thermochemically regenerated with eight moles of water burns in air to produce seventeen moles of water. Only eight moles out of the seventeen needs to be collected and recycled:

$$C_8H_{18} + 8H_2O \longrightarrow 8CO + 17H_2 \text{ ("ENGINEFUEL")} \quad \text{Eqn. 13}$$

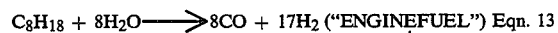

$$\longrightarrow 8CO + 17H_2 + 12.5O_2 \longrightarrow 8CO_2 + 17H_2O \quad \text{Eqn. 14}$$

Similarly only one mole of water out of three needs to collected when methane is converted to engine-fuel.

$$CH_4 + H_2O \longrightarrow CO + 3H_2 \text{ (ENGINEFUEL)} \quad \text{Eqn. 15}$$

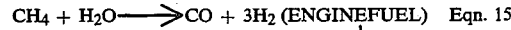

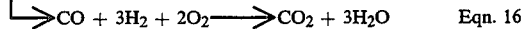
$$\longrightarrow CO + 3H_2 + 2O_2 \longrightarrow CO_2 + 3H_2O \quad \text{Eqn. 16}$$

Nature ultimately condenses water from heat-engine exhaust streams. The familiar plume of condensed water droplets that form in automobile exhaust streams during cold weather are an example of prompt condensations. Rain from clouds and fog are examples of more delayed condensations in which automobile exhaust contributions are added to water evaporated from oceans, lakes, and rivers and to water transpired by vegetation.

In order for approximately half of the water in an engine's exhaust to be recaptured for thermochemical regeneration, most of the exhaust stream must be cooled to approximately 200 degrees F. Assuming daytime high ambient temperatures of 120 degrees F. (and most places would have a lower daytime high temperature), there would be about an 80 degree (F.) gradient for heat exchange to the atmosphere. Heat exchanges shown in FIG. 8 provides extremely high surface area and turbulence in the heat exchange process.

Flat-tube heat exchanger components used in 144 and 256 are self-reinforcing and extremely conservative in the use of corrosion-resistant materials. These designs have been proven capable of extremely rapid fabrication rates. The regime of FIG. 8 is suitable, therefore, for the high-volume production requirements for automotive applications.

Figure 8:
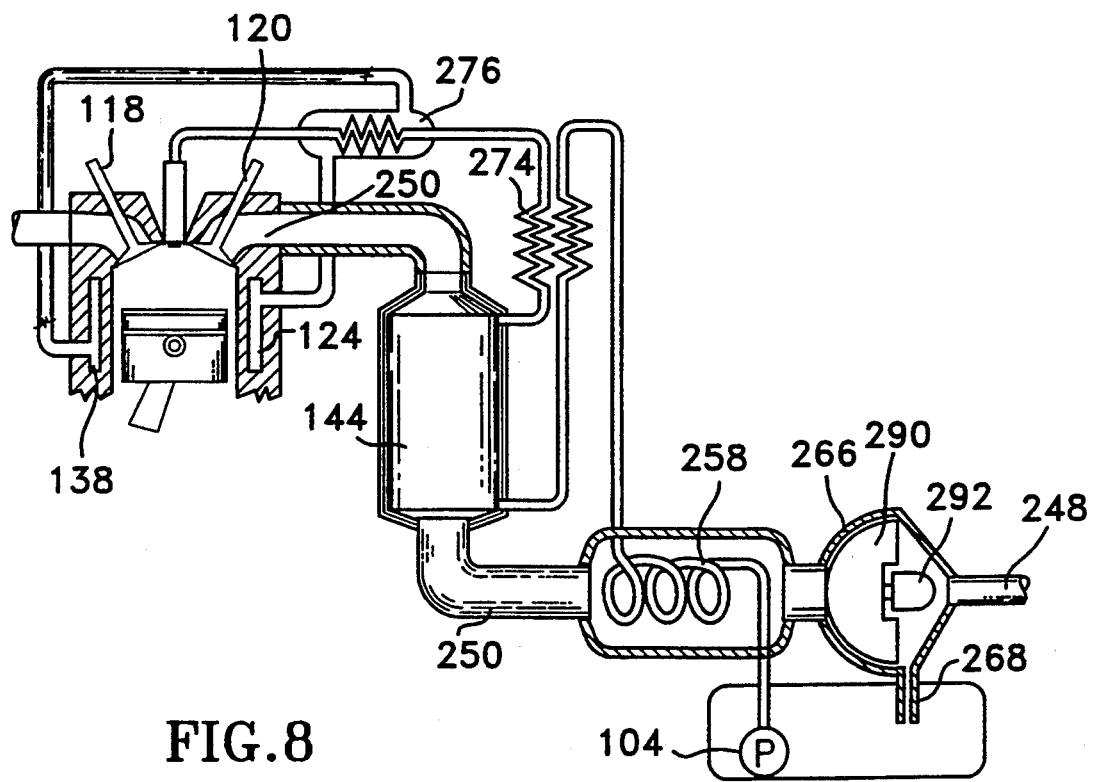
FIG. 8 is a schematic view of one embodiment of an apparatus utilized in accordance with the principles of the present invention for recovering energy and waste water from the exhaust stream of an internal combustion engine constructed in accordance with the principles of the present invention.

Collection of water from the exhaust stream is preferably accomplished by the process illustrated in FIG. 8. Exhaust gases 250 from combustion chambers of an internal combustion engine are first used to drive a suitable air motor 252 which in turn drives a suitable compressor 254 to increase the amount of air entering the combustion chambers of the engine. Exhaust gases leaving air motor 252 enter heat exchanger 144 for the endothermic production of engine-fuel. Exhaust gases pass from heat exchanger 144 to heat exchanger 256 for heat rejection to engine-fuel reactants in fin-tube 258 and to the atmosphere from fins 260. A second air motor 262, which is mechanically coupled to air motor 252 and compressor 254 by shaft 264 as shown, extracts additional work from the expanding exhaust gases and centrifugally accelerates condensed water collection shroud 266 for delivery of water through tube 268 to tank 102.

Engine-fuel reactants are stored in tank 102. Pump 104 delivers reactants to fin-tube 258 of countercurrent heat exchanger 256. Reactant fluid is then further heated in regenerative heat exchanger 274 as engine-fuel is cooled by exchange to incoming supplies of feed stock reactants traveling to enter the coolest region of thermochemical converter 144. Fuel injection and ignition of engine-fuel in the combustion chamber is preferably accomplished by embodiment 40 which is shown in detail by FIG. 2.

Hot exhaust 250 contains all of the water vapor produced by the combustion process. As heat is extracted the relative humidity reaches 100% and liquid water can be extracted by exducer turbine 262. Exducer turbine 262 is preferably made from materials such as carbon-fiber reinforced liquid-crystal polymers that are not corroded or eroded by condensing water droplets. Turbine 252 is preferably made from conventional iron-based superalloys that have traditionally been selected for resistance to oxidation and creep in such applications. Compressor 254 is preferably made from aluminum, magnesium or polymer compounds depending upon the size of the engine and required life of system components.

A particularly advantageous aspect of the present invention is the gain in expansion gases compared to compression gases. For the greatest part of the compression cycle only air is present. At the time near top dead center when pressure increase is desired, engine-fuel is injected and combusted to produce far more hot expansion gases than would be present if conventional fuels were used as homogeneous charges or if conventional fuels were injected and burned as stratified charges. This is illustrated by comparison of the processes of the present invention using methane and using engine-fuel derived from methane.

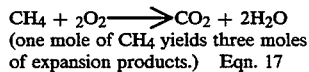
(one mole of $CH_4$ yields three moles of expansion products.)  Eqn. 17

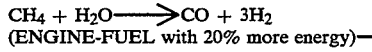
(ENGINE-FUEL with 20% more energy)

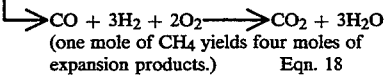
(one mole of $CH_4$ yields four moles of expansion products.)  Eqn. 18

The present invention provides a cycle with more molecules of expansion products than compression molecules. This results in greater power ratings for the same engine and increases the thermal efficiency of the process.

It is anticipated that large stationary engine applications with more or less constant speed operation, will place thermochemical reactor 144 in front of power turbine 252 for the purpose of improving the overall thermal efficiency of the system. In mobil applications where it is desired to gain the highest power to weight ratio, it is anticipated that power turbine 252 would be placed in front of thermochemical converter 144 as shown. In instances that it is not desired to add recovered water to stored fuel feedstocks in tank 102, condensed water from 268 may be added to reservoir 160 as shown in FIG. 4. When the rate of water collection exceeds the desired rate of storage (as is the case in cool weather) heat rejection from fin 260 is attenuated to reduce the rate of condensation to collector shroud 266.

In instances where it is desireable to reduce the thermal signal of heat engines, the invention provides exhaust gas temperatures approaching ambient temperature. This effect may be emphasized by sizing exducer turbine 262 for expansion of the exhaust gases to ambient pressure.

Creating carbon monoxide and hydrogen from water and hydrocarbon fuels by regenerative use of engine waste heat provides at least 20% more range and fuel economy. This process virtually eliminates carbon monoxide and unburned hydrocarbon emissions because combustion of engine fuel is characterized by extremely fast hydrogen burning characteristics to force carbon monoxide to complete combustion processes with excess air to yield carbon dioxide. Improved process efficiencies of the converted engine include:

1. Engine-fuel produces about 20% more heat than burning the feedstock fuel.

2. The invention reduces combustion-radiation losses by converting high-radiation feedstock fuels to low-radiation engine fuels.

3. Engine-fuel burns about 7.5 times faster than feedstock fuels. This allows the invention to produce a pressure rise that is much faster and to occur substantially at or after top-dead-center conditions. Both mechanical efficiency and thermal efficiency are improved.

4. The invention burns engine-fuel in locally fuel-rich conditions within excess air to enhance high-flame-speed advantages.

5. The invention burns engine-fuel in locally fuel-rich conditions within excess air to reduce conductive losses to combustion chamber surfaces.

6. Combustion of engine-fuel within excess insulating air assures completion of combustion processes and elimination of unburned hydrocarbons and carbon monoxide.

7. Oxides of nitrogen are greatly reduced by rapid combustion of fuel-rich zones within excess air envelopes. This virtually eliminates quenching of oxides of nitrogen on combustion chamber surfaces and provides time for dissociation reactions of oxides of nitrogen to nitrogen and oxygen.

It has been found that the invention provides substantial improvements in thermal efficiency and reductions in undesirable emissions even when only a fraction of the hydrocarbon fuel is converted into hydrogen and carbon monoxide. This is especially true in the instance of using alternate fuels such as methane, propane, butane, and fuel alcohols. Converting some of the hydrocarbon fuel to hydrogen greatly increases flame speed and completion of combustion processes in the combustion chamber. This provides designers with a great latitude in applying the invention to various engine sizes and applications. Heavy-work engines using large amounts of fuel such as railroad locomotives would be provided with sufficiently large thermochemical converters (144) to convert essentially all of the hydrocarbon fuel to carbon monoxide for maximum fuel economy. Smaller engines such as those used for lawn mowers and motorcycles might be expected to sacrifice some of the fuel economy potential (offered by total conversion of the hydrocarbon fuel to hydrogen and carbon monoxide) for needed reductions of unwanted emissions.

In instances that the primary fuel selection is satisfactorily vaporized at the temperature and heat input conditions of heat exchanger 256, it is preferred to modulate flow through 144 to maintain optimum operating conditions. Examples of fuels of this type are methanol, ethanol, butane, gasoline, propane, and methane. This is especially helpful in large engines applied in stop and go applications such as a city bus. Three-way valve 270 provides for start-up of the engine on fuel passing directly from heat exchanger 256 to spark-injector 40. Valve 270 preferably provides variable division of flow to heat exchanger 274 and the by-pass circuit to spark-injector 40 as shown. This is done by operating valve 40 as a variable on-time digital flow controller. Fluid is passed through valve 270 to heat exchanger 274 for a short period of time ($t_1$) and then is passed through valve 270 for a short period of time ($t_2$). The magnitude of $t_1$ ranges from about 30 milliseconds to full time operation. The magnitude of $t_2$ ranges from about 30 milliseconds to full time operation. The ratio of $t_1/t_2$ provides control of the ratio of engine-fuel to unconverted reagents. The ratio of $t_1/t_2$ may be adjusted in response to the temperature of thermochemical converter 144 or in response to other optimization algorithms.

It is generally desired to provide by-pass flow $t_2$ of at least 4% in each 600 milliseconds of operation after achieving a minimum threshold temperature in 144 for the purpose of inducing turbulence in the channels of 144. After exceeding the minimum threshold temperature in converter 144 it is preferred to operate with full time flow of reagents through 144. Modulation of flow to 144 provides the ability to achieve greatest conversion of reagents to engine-fuel under all duty cycles of the engine.

Static mixer 272 assures that engine-fuel from 144 is evenly mixed with reagent vapors that are by-passed through valve 270. Accumulator 296 provides pressure smoothing of fluids that are modulated by valve 270 and smoothing of pressure variations resulting from transient conditions as the engine is changed in operating conditions.

Figure 9A:
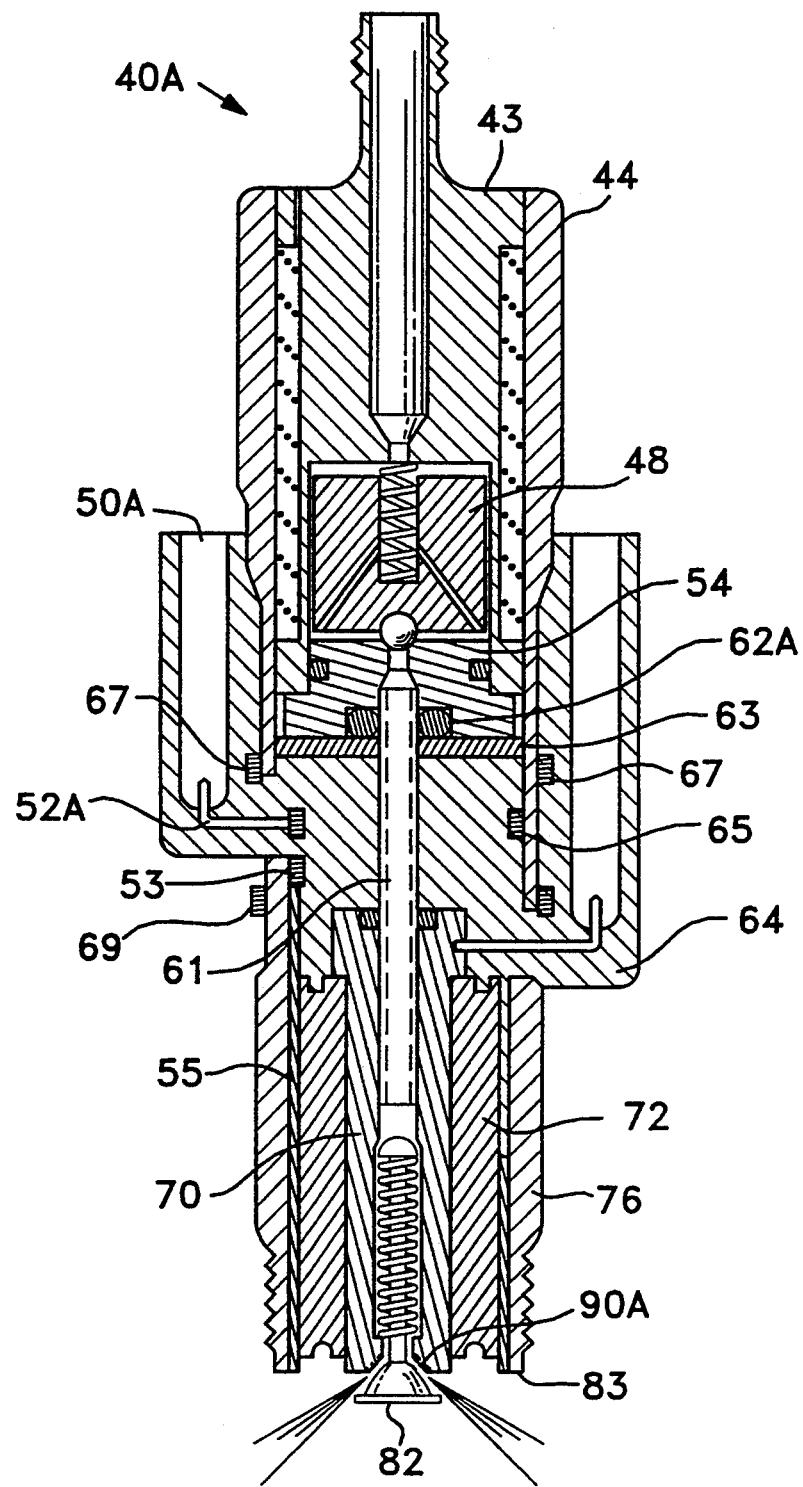
FIG. 9 shows a schematic view of another embodiment of an apparatus for recovering energy and waste water from the exhaust stream of an internal combustion engine.
Figure 9B:
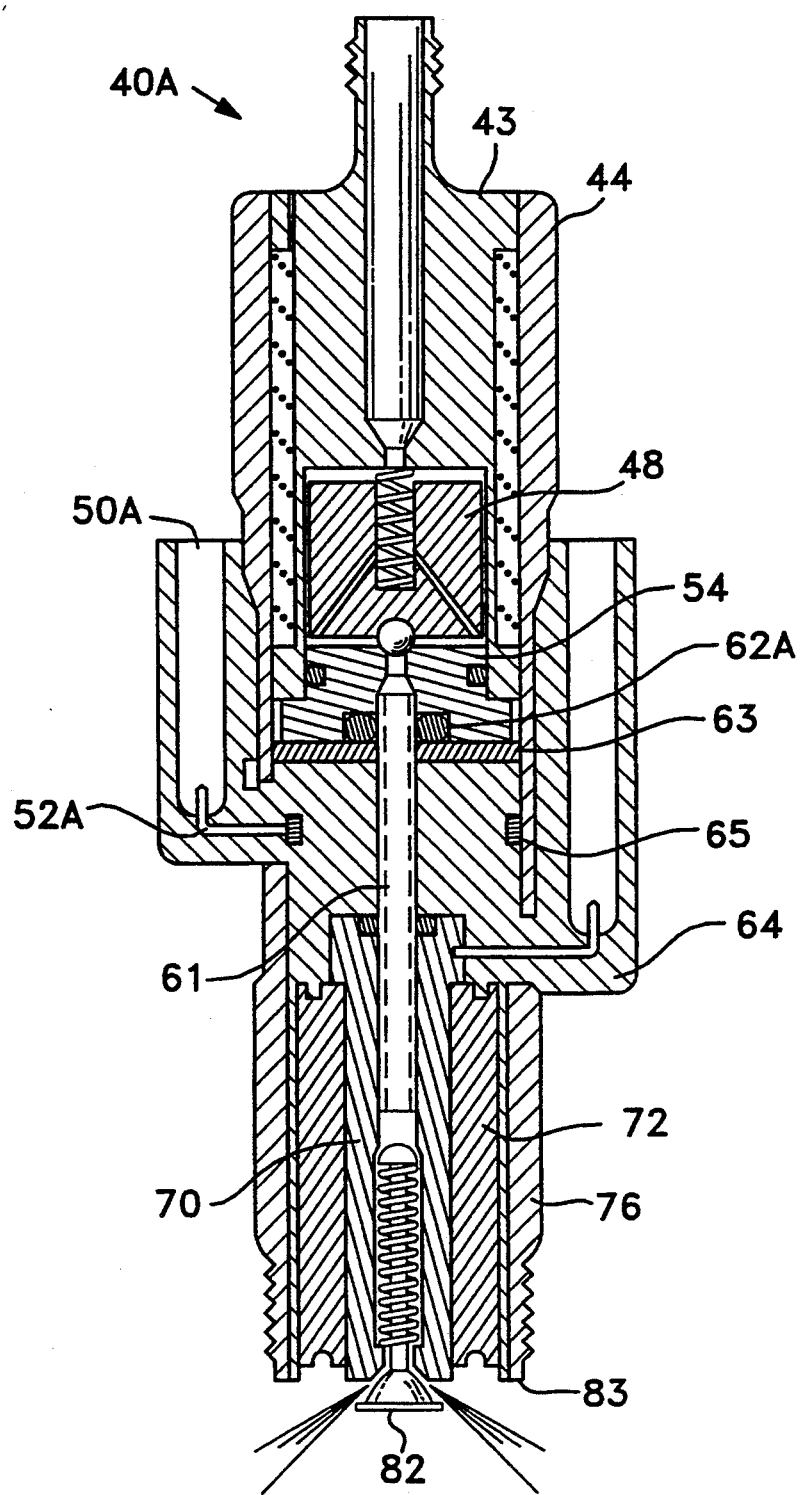
Figure 1:
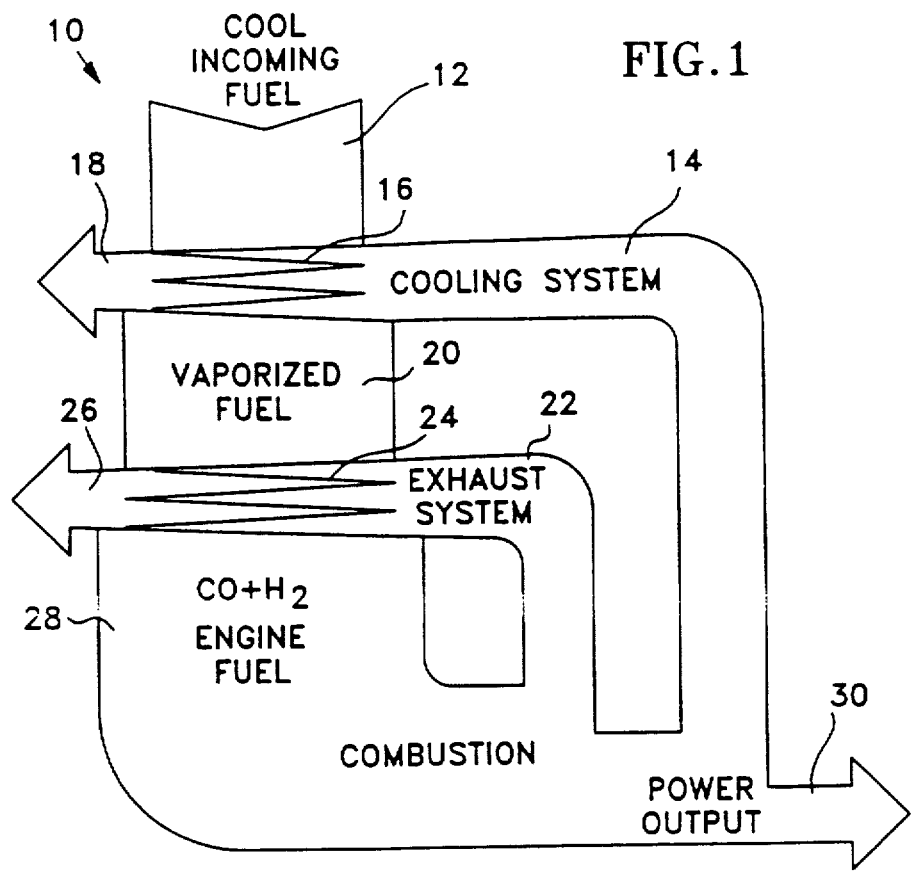
Figure 4:
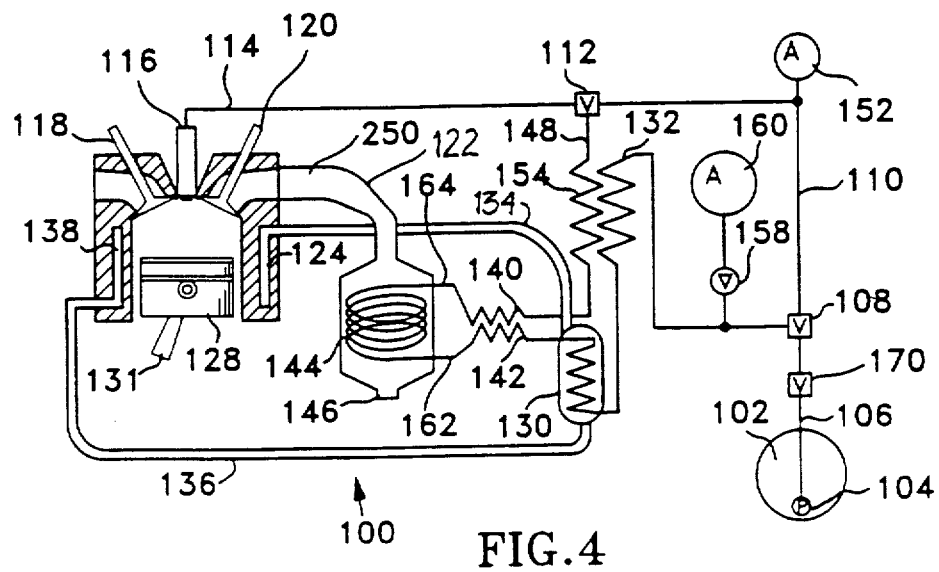
Figure 9B:
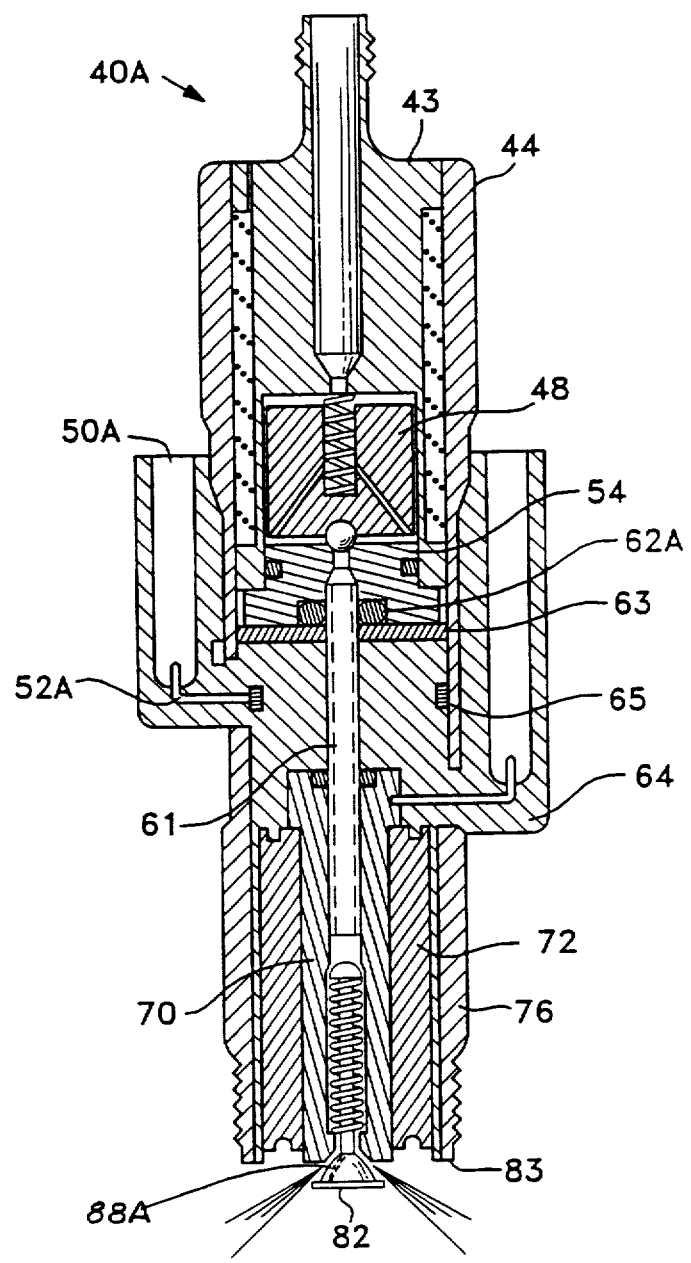

In instances that it is not desired to use an exhaust-driven exducer motor, it is preferred to use an electric motor (292) driven water exducer 290 as shown in FIG. 9. Hydrocarbon fuel is added at 266 and mixed with condensate water in 102. Pump 104 pressurizes liquid feedstock stored in 102 and delivers to heat exchanger fin-tube 258. Countercurrent heat exchanger 274 extracts heat from engine-fuel that has been produced in 144. Heat exchanger 276 may be used to standardize engine fuel temperature by exchange to temperature regulated engine coolant.

Ignition of the stratified fuel and burning in locally fuel rich conditions that are surrounded by excess air dramatically improves combustion rates over lean-burn homogeneous-charge conditions and reduces oxides of nitrogen. Flame characteristics are typical to transparent burning of hydrogen rather than gasoline or Diesel flame fronts. Radiation losses are minimized. Conductive losses are minimized. Resulting thermal efficiencies exceed the gain provided by the endothermic conversion of feedstock fuel to engine-fuel. Compared to conventional operation, improved fuel economy and reduced emissions during cold-engine conditions with direct-injection and spark-ignition are achieved. Later, after reaching the engine's designated operating temperature, the invention provides useful recovery of engine waste heat by operation on engine-fuel that produces considerably more energy upon combustion than the feedstock liquid fuels. The invention facilitates these fuel efficiency advantages without sacrificing specific power ratings of the engine in power-per-thermal-unit comparisons.

It thus will be understood that the objects of this invention have been fully and effectively accomplished. It will be realized, however that the foregoing preferred specific embodiment has been shown and described for the purpose of illustrating the functional and structural principles of this invention and is subject to change without departure from such principles. Therefore, this invention includes all modifications encompassed within the spirit and scope of the following claims.

What is claimed is:

1. A process for operating an internal combustion engine with intake, compression, power, and exhaust cycle-portions having a combustion chamber which comprises: subjecting primary fuel containing combined hydrogen to waste heat developed by said engine to produce engine-fuel containing free hydrogen, introducing air into said chamber during the air intake cycle-portion of said chamber, injecting substantial amounts of said engine-fuel into said chamber during the compression cycle-portion of said chamber following said intake cycle-portion, and creating ignition spark in said chamber at the point of injection of said engine-fuel into said chamber to ignite said injected engine-fuel.

2. A process as specified in claim 1 wherein said ignition spark comprises a plurality of substantially radial sparks extending from the point of injection of engine-fuel in said chamber.

3. A process as specified in claim 1 wherein said ignition spark is timed to substantially occur within said engine-fuel to produce a plasma that is energized sufficiently to cause ignition of said engine-fuel that contacts air within said chamber.

4. A process as specified in claim 1 wherein said ignition spark is timed to substantially occur in air to produce a plasma of air that is energized sufficiently to cause ignition of said engine-fuel that contacts air energized by said plasma.

5. A process as specified in claim 1 wherein the hydrogen in said primary fuel is chemically combined with carbon, introducing an oxygen donor into said primary fuel whereby an engine-fuel containing carbon monoxide in addition to free hydrogen is produced.

6. A process as in claim 1 wherein the exhaust stream of said engine is cooled by extracting work due to passing substantial quantities of said exhaust stream through a suitable gas motor which drives an external load.

7. Apparatus for supplying engine-fuel to an internal combustion engine having a combustion chamber comprising: a closely wound tubular spiral adapted to be located to be heated by waste heat developed by said engine, means to supply a stream of primary fuel containing combined hydrogen to said spiral to produce engine-fuel containing free hydrogen, means for injecting a stream of said engine-fuel into said chamber, said last mentioned means providing an electrode in said chamber substantially in the direct path of said engine-fuel stream entering said chamber to ignite fuel when actuated.

8. Apparatus as specified in claim 7 wherein said electrode provides multiple points whereby a plurality of sparks are produced when said electrode is actuated.

9. A combined fuel supply conduit and ignition apparatus adapted to be received in an opening to the combustion chamber of an internal combustion engine, said apparatus comprising a tubular member adapted to form a pressure holding seal with said opening, and providing a passageway for fuel to enter said chamber, a generally centrally disposed electrode extending from said passageway into said chamber when said apparatus is located in said opening, valve means to open or close said passageway to control flow of fuel therethrough into said electrode, said electrode having multiple points whereby when actuated substantially radially extending ignition sparks are produced.

10. An apparatus as specified in claim 9 wherein said ignition sparks are timed by a suitable means to substantially occur in air to produce a plasma of air that is energized sufficiently to cause ignition of said fuel that contacts the air.

11. An apparatus as specified in claim 9 wherein said ignition sparks are timed by a suitable means to substantially occur in said fuel to produce a plasma that is energized sufficiently to cause ignition of said fuel that contacts air.

12. A process for operating an internal combustion engine with intake, compression, power, and exhaust cycle-portions having a combustion chamber which comprises: subjecting primary fuel containing combined hydrogen to waste heat developed by said engine and chemical compounds containing oxygen recovered from the exhaust stream of said engine to produce engine-fuel containing free hydrogen, introducing air into said chamber during the air intake cycle-portion of said chamber, injecting substantial amounts of said engine-fuel into said chamber during the compression cycle-portion of said chamber following said intake cycle-portion, creating ignition spark in said chamber at the point injection of said engine-fuel into said chamber to ignite said injected engine-fuel, cooling said exhaust stream by heat exchanges to said primary fuel, extracting substantial quantities of said chemical compounds by a suitable exducer and adding said chemical compounds to said primary fuel.

13. A process as in claim 12 wherein said exhaust stream is cooled by extracting work due to passing substantial quantities of said exhaust stream through a suitable gas motor which drives the exducer to extract said chemical compounds from said exhaust stream.

14. A process as in claim 12 wherein said exhaust stream is cooled by extracting work due to passing substantial quantities of said exhaust stream through a suitable gas motor which drives the exducer to extract said chemical compounds from said exhaust stream and wherein said motor drives a compressor to increase the amount of air that enters said engine during said intake cycle-portion.

15. A process for starting an internal combustion engine with intake, compression, power, and exhaust cycle-portions having one or more combustion chambers which comprises: introducing air into said chambers, injecting substantial amounts of fuel into each of said chambers within the power cycle-portion condition of said engine, creating ignition spark in said chamber at the point of injection of said fuel into said chamber for igniting said injected fuel and to cause pressure rise sufficient to rotate said engine and repeating said injecting and igniting steps in each subsequent combustion chamber as it reaches power cycle-conditions to achieve a suitable rotational speed in said engine.

* * * * *

UNITED STATES PATENT AND TRADEMARK OFFICE
CERTIFICATE OF CORRECTION

PATENT NO. : 5,343,699
DATED : September 6, 1994
INVENTOR(S) : Roy E. McAlister

It is certified that error appears in the above-indentified patent and that said Letters Patent is hereby corrected as shown below:

The title page should be deleted to be replaced with per attached title page.

Figures 1, 4 and 9B should appear as shown on the attached sheets.

United States Patent [19]

McAlister

[11] Patent Number: 5,343,699
[45] Date of Patent: Sep. 6, 1994

[54] METHOD AND APPARATUS FOR IMPROVED OPERATION OF INTERNAL COMBUSTION ENGINES

[76] Inventor: Roy E. McAlister, 216 S. Clark, MS 103, Tempe, Ariz. 85281

[21] Appl. No.: 990,071

[22] Filed: Dec. 14, 1992

Related U.S. Application Data

[63] Continuation of Ser. No. 364,309, Jun. 12, 1989, abandoned.

[51] Int. Cl.$^5$ .............. F02B 17/00; F02B 43/00; F02M 21/02; F02M 57/06
[52] U.S. Cl. .............. 60/273; 60/309; 123/1 A; 123/3; 123/151; 123/169 V; 123/348; 123/430; 123/527
[58] Field of Search .............. 60/309, 273; 123/1 A, 123/3, 90.11, 348, 430, 527, 151, 152, 169 V

[56] References Cited

U.S. PATENT DOCUMENTS

| | | | |
|---|---|---|---|
| 1,401,612 | 12/1921 | Landgrebe | 123/151 |
| 3,094,974 | 6/1963 | Barber. | |
| 3,173,409 | 3/1965 | Warren | 123/169 V |
| 3,315,650 | 4/1967 | Bishop et al. | |
| 3,682,142 | 8/1972 | Newkirk | 123/3 |
| 3,830,204 | 8/1974 | McAlister. | |
| 3,976,034 | 8/1976 | Shinohara | 123/1 A |
| 4,003,343 | 1/1977 | Lee | 123/3 |
| 4,046,522 | 9/1977 | Chen | 123/3 |
| 4,086,877 | 5/1978 | Henkel | 123/3 |
| 4,086,878 | 5/1978 | Eisele | 123/430 |
| 4,108,114 | 8/1978 | Kosaka | 123/3 |
| 4,109,461 | 8/1978 | Fujitani | 123/3 |
| 4,181,100 | 1/1980 | Yamane et al. | |
| 4,253,428 | 3/1981 | Billings et al. | |
| 4,340,013 | 7/1982 | Lindstrom | 123/3 |
| 4,362,137 | 12/1982 | O'Hare. | |
| 4,418,653 | 12/1983 | Yoon | 123/3 |
| 4,441,469 | 4/1984 | Wilke. | |
| 4,475,484 | 10/1984 | Filho | 123/3 |
| 4,503,813 | 3/1985 | Lindberg. | |
| 4,515,135 | 5/1985 | Glass. | |
| 4,716,859 | 1/1988 | Konig | 123/3 |
| 4,722,303 | 2/1988 | Leonhard | 123/3 |
| 4,967,708 | 11/1990 | Linder | 123/169 V |

FOREIGN PATENT DOCUMENTS 2410473  9/1975  Fed. Rep. of Germany .......... 123/3

OTHER PUBLICATIONS

Davis et al., "Fuel Injection and Positive Ignition-A Basis for Improved Efficiency and Economy", SAE Progress in Technology Review vol. II, Society of Automotive Engineers, 1967, pp. 343–357.

Finsterwalder, "Deutz Converts Operation by Adding High-Tension Ignition System", Automotive Engineering, Dec. 1971, pp. 28–32.

Simko et al., "Exhaust Emission Control by the Ford Programmed Combustion Process-PROCO", SAE Paper No. 720052, pp. 249–264.

Breshears et al., "Partial Hydrogen Injection inot Internal Combustion Engines Effect on Emissions and Fuel Economy", Jet Propulsion Laboratory, California Institute of Technology, Feb. 1974, pp. i–iv, 1–37.

Finegold, et al., "Dissociated Methanol as a Consumable Hydride for Automobiles and Gas Turbines", Jun. 1982, pp. 1359–1369.

Primary Examiner—Douglas Hart

[57] ABSTRACT

A process for operating an internal combustion heat engine which comprises the steps of thermochemically regenerating waste heat rejected by the heat engine by reacting at least one conventional fuel compound containing hydrogen and carbon with an oxygen donor using substantial quantities of the waste heat to produce a mixture of engine-fuel containing substantial quantities of hydrogen and carbon monoxide and utilizing the mixture of engine-fuel to operate an internal combustion engine.

15 Claims, 7 Drawing Sheets

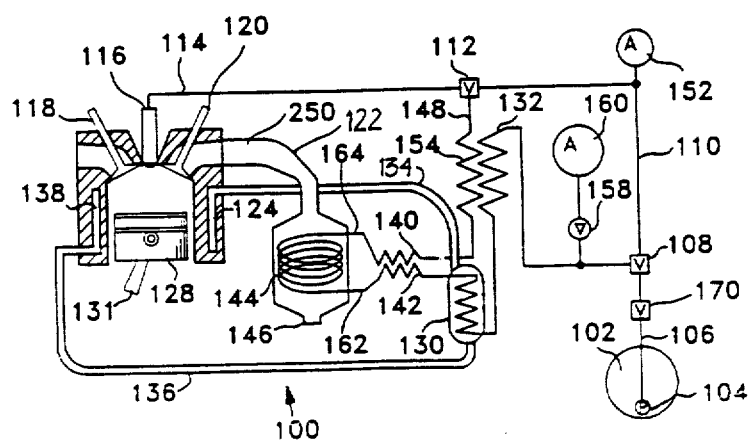

UNITED STATES PATENT AND TRADEMARK OFFICE
CERTIFICATE OF CORRECTION

PATENT NO. : 5,343,699
DATED : September 6, 1994
INVENTOR(S) : Roy E. McAlister

It is certified that error appears in the above-indentified patent and that said Letters Patent is hereby corrected as shown below:

On title page, item [56]
In the list of "Other Publications" please correct the "inot" by replacing it with -- into -- in the Breshears title and add the source for the Finegold publication which is -- Hydrogen Energy Progress IV, --.

In column 6, strike lines 43, 44, and 45.

In column 6, replace "8" in line 46 with -- 7 --.

In column 6, replace "9" in line 52 with -- 8 --.

In column 6, in line 56 add the following:

-- Fig. 9A shows an embodiment of a combined fuel injector and ignition device constructed in accordance with the principles of the present invention.

Fig. 9B shows another embodiment of the combined fuel injector and ignition device constructed in accordance with the principles of the invention --.

In column 9 on line 26 after "90" add -- as shown in Figures 9A and 9B --.

In column 12, in line 9 replace "7" with -- 6 --.

In Column 13 in line 10 replace "0,010" with -- 0.010 --.

UNITED STATES PATENT AND TRADEMARK OFFICE
CERTIFICATE OF CORRECTION

PATENT NO. : 5,343,699
DATED : September 6, 1994
INVENTOR(S) : Roy E. McAlister

It is certified that error appears in the above-indentified patent and that said Letters Patent is hereby corrected as shown below:

In Column 13 in line 11 replace "0,060" with -- 0.060 --.

In Column 13 in line 45 replace "177" with -- 17-7PH --.

In Column 16 in line 60 replace "Fig. 8" with -- Figs. 5, 6, and 7 --.

In Column 17 in line 2 replace "8" with -- 7 --.

In Column 17 in line 57 do not subscript the first -- 2 --.

In Column 19 in line 63 replace "9" with -- 8 --.

Signed and Sealed this

Twenty-fifth Day of April, 1995

Attest:

BRUCE LEHMAN

Attesting Officer     Commissioner of Patents and Trademarks